United States Patent [19]

Watanabe et al.

[11] Patent Number: 5,432,419

[45] Date of Patent: Jul. 11, 1995

[54] RECORDING MEDIUM LIBRARY SYSTEM

[75] Inventors: Shuko Watanabe; Ryuuichi Miyaguchi, both of Kawasaki, Japan

[73] Assignee: Fujitsu Limited, Kawasaki, Japan

[21] Appl. No.: 52,647

[22] Filed: Apr. 26, 1993

[30] Foreign Application Priority Data

| Apr. 28, 1992 | [JP] | Japan | 4-109925 |
| Apr. 28, 1992 | [JP] | Japan | 4-109926 |
| May 22, 1992 | [JP] | Japan | 4-130780 |
| May 22, 1992 | [JP] | Japan | 4-130782 |

[51] Int. Cl.$^6$ ............................................. G05B 11/01
[52] U.S. Cl. ........................................ 318/560; 318/561;
318/46; 318/757; 318/362
[58] Field of Search ............. 318/560, 561; 89/46, 89/757, 362

[56] References Cited

U.S. PATENT DOCUMENTS

| 4,495,853 | 1/1985 | Gottwaldt | 89/46 |
| 4,558,265 | 12/1985 | Hayashida et al. | 318/561 |
| 5,250,884 | 10/1993 | Okumura | 318/560 |

FOREIGN PATENT DOCUMENTS

| 57-203247 | 12/1982 | Japan . |
| 63-9055 | 1/1988 | Japan . |
| 1-144266 | 6/1989 | Japan . |
| 3-78805 | 4/1991 | Japan . |
| 4-229433 | 8/1992 | Japan . |

*Primary Examiner*—William M. Shoop, Jr
*Assistant Examiner*—Karen Masih
*Attorney, Agent, or Firm*—Greer, Burns & Crain, Ltd.

[57] ABSTRACT

A recording medium library system retaining up to a predetermined number of cartridge type recording media for recording/reproducing data on the recording medium is disclosed. The recording media are stored in a plurality of cells provided in a cell drum. The cell drum is rotatably driven such that a desired cell is brought to a target position. In the driving, an accelerating current, a braking current, and a positioning current are supplied to the motor in order of mention. At least the braking current is determined according to an input value of the inertia of the cell drum.

27 Claims, 26 Drawing Sheets

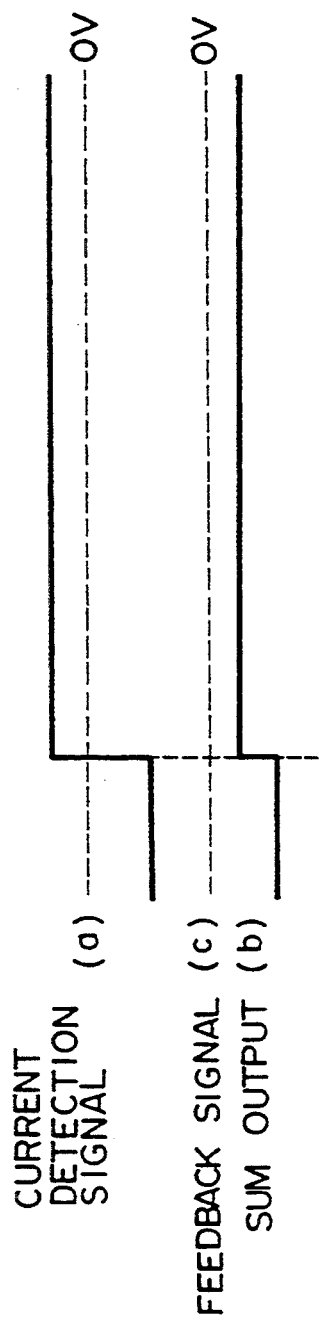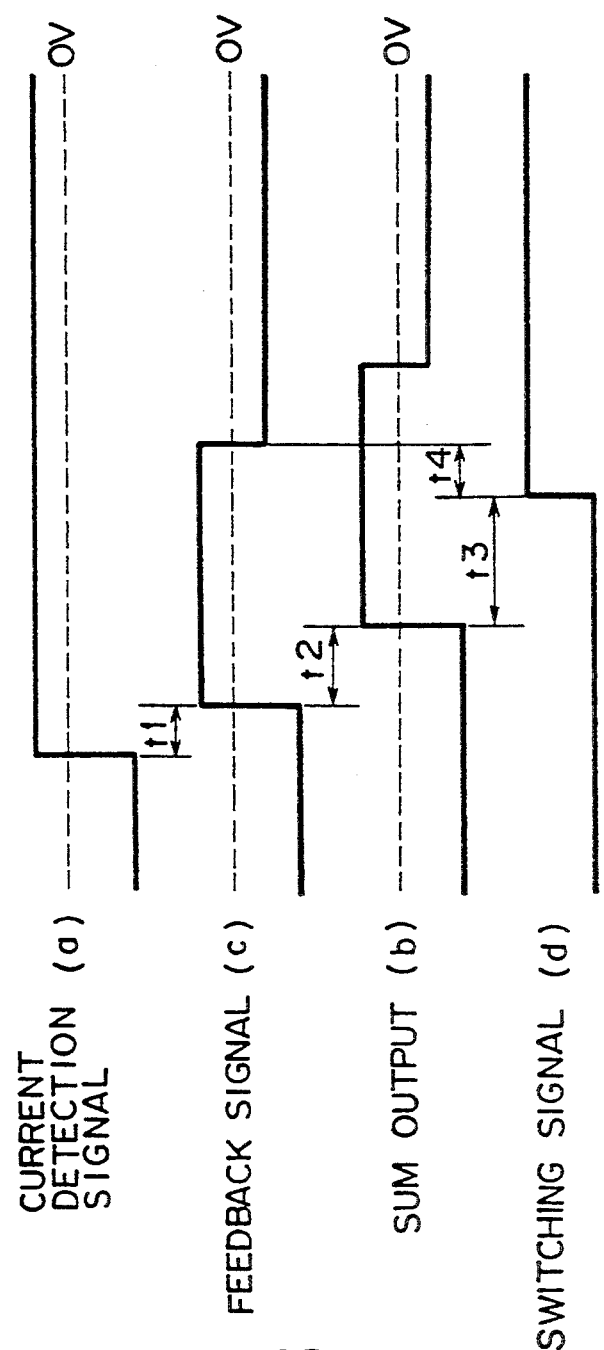

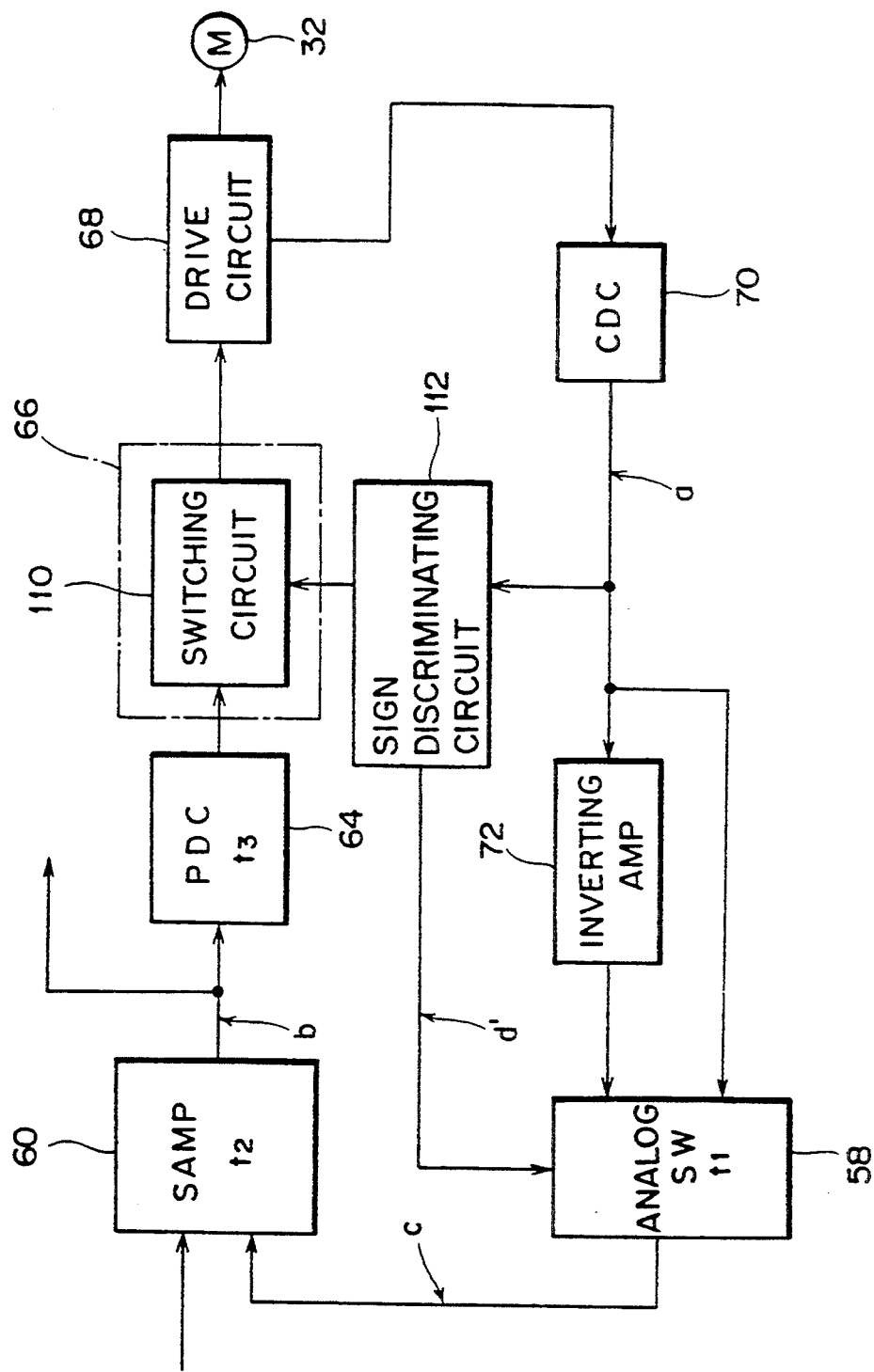

RECORDING MEDIUM LIBRARY SYSTEM

BACKGROUND OF THE INVENTION

1. Field of the Invention

The present invention generally relates to a recording medium library system for recording/reproducing data on a recording medium such as a magnetic tape of a cartridge type and, more particularly, to a recording medium library system having a cell drum for retaining up to a predetermined number of recording media.

2. Description of the Related Art

A recording medium library system is known for example as one of the peripheral units of the computer. The library system is arranged, having each of the recording media such as magnetic tapes put in its cartridge, such that the cartridges are stored in the body of the system and according to the need a desired cartridge is automatically taken out so that data is recorded/reproduced on the recording medium. In a library system employing a cell drum having a plurality of cells for storing the recording media therein, the cell drum is rotatively driven when a cartridge is put in or taken out such that a desired cell is brought to a target position, i.e., accessible position. In the driving, it is required to stop the cell drum at the target position quicker and producing no vibration.

The inertia of the cell drum varies with the number of recording media stored in the cell drum and the weight of each recording medium. Accordingly, in the rotative driving of the cell drum, if its inertia is not properly taken into account, that substantial time may be taken before the cell drum reaches the target position or the cell drum may produce vibration during positioning control thereof.

SUMMARY OF THE INVENTION

Accordingly, an object of the present invention is to provide a library system capable of bringing the cell drum to its target position as quickly as possible and without producing vibration.

Another object of the present invention is to provide a novel control circuit of a DC servomotor for use in the library system.

According to one aspect of the present invention, there is provided a recording medium library system retaining up to a predetermined number of recording media of a cartridge type for recording/reproducing data on the recording media comprising a cell drum having a plurality of cells arranged at least in its circular direction for storing the recording media therein, a motor having a shaft and outputting torque through the shaft, a rotating mechanism rotatably supporting the cell drum and transmitting output torque from the motor to the cell drum, a tachometer connected to the shaft for outputting a signal corresponding to the rotating speed of the shaft, inertia input means inputting inertia of the cell drum, said inertia varying according to the number of the recording media stored in the cell drum and weight of each recording medium, and motor drive means receiving the output signal from the tachometer for driving the motor such that the cell drum rotates a desired total angle of rotation, wherein the total angle of rotation is an angle of rotation necessary for moving a desired cell selected from the plurality of cells to a target position, and wherein the motor drive means includes means for supplying an accelerating current to the motor until the cell drum attains a predetermined speed, means for supplying a braking current determined according to the input inertia to the motor, and means for supplying a positioning current to the motor for positioning control of the desired cell to the target position.

According to another aspect of the present invention, there is provided a control circuit of a DC servomotor comprising adder means for adding a feedback signal to a directive value from a host control unit, means for receiving the output from the adder means and generating a pulse train for driving the motor, means for receiving the pulse train and a signal from the host control unit and generating a switching control signal, drive means receiving the switching control signal for driving the motor, current detection means for detecting current flowing through the motor, output means receiving the output signal from the current detection means for outputting its inverted signal, an analog switch receiving the inverted signal and the output signal of the current detection means for selecting either of the received signals and outputting the selected signal to the adder means as the feedback signal, and sign discrimination means for discriminating between positiveness and negativeness of the output signal of the current detection means, wherein the analog switch operates, on the basis of the result of discrimination in the sign discrimination means, such that the feedback signal produces a negative feedback effect on the directive value.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 26A and FIG. 26B are waveform charts of signals at several points in FIG. 25;

FIG. 27 is a block diagram showing an improvement of the control circuit of FIG. 25.

DESCRIPTION OF THE PREFERRED EMBODIMENTS

A preferred embodiment of the present invention will be described below with reference to the accompanying drawings.

Figure 1:
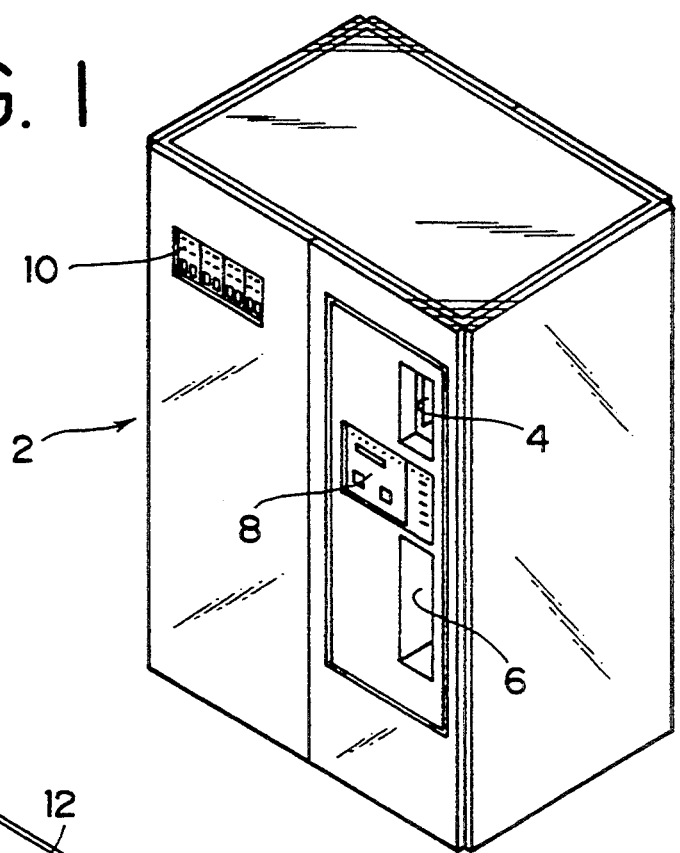
FIG. 1 is a perspective view seen from the front side of a library apparatus of magnetic tape cartridges to which the present invention is applied.
Figure 2:
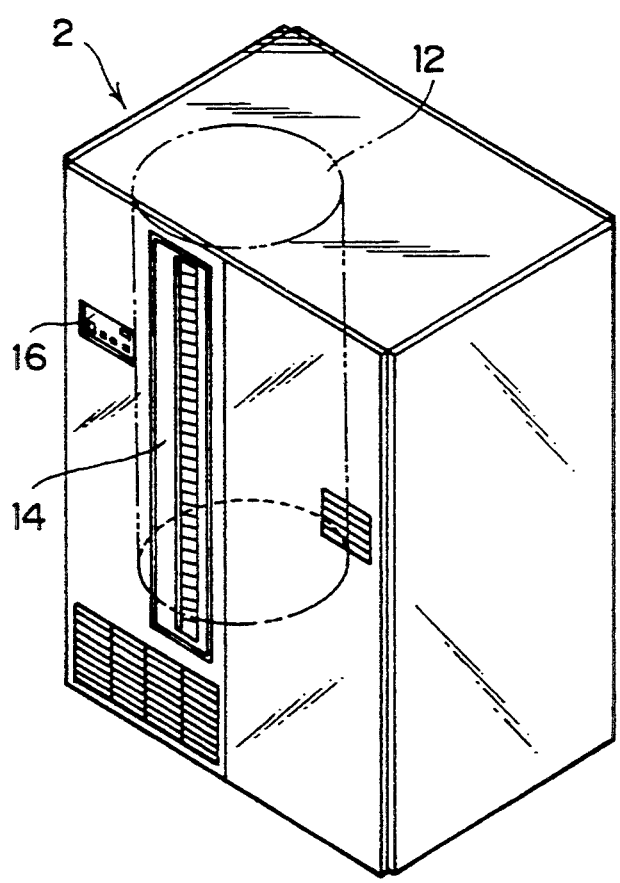
FIG. 2 is a perspective view seen from the rear side of the library apparatus of FIG. 1.

FIG. 1 is a perspective view seen from the front side of a library apparatus of magnetic tape cartridges to which the present invention is applied and FIG. 2 is a perspective view seen from the rear side of the library apparatus of FIG. 1. The library apparatus stores therein a number of magnetic tape cartridges used for example as external storage media of a computer and according to the need allows a desired cartridge to be picked up so that recording/reproduction of data on the cartridge is achieved. As shown in FIG. 1, on the front side of the library body 2, there are provided a cartridge inlet 4, a cartridge outlet 6, and operator panels 8 and 10. Further, on the rear side of the library body 2, as shown in FIG. 2, there are provided a door 14 for direct charging/discharging of cartridges, and an operator panel 16 for the direct charging/discharging of cartridges.

Figure 3:
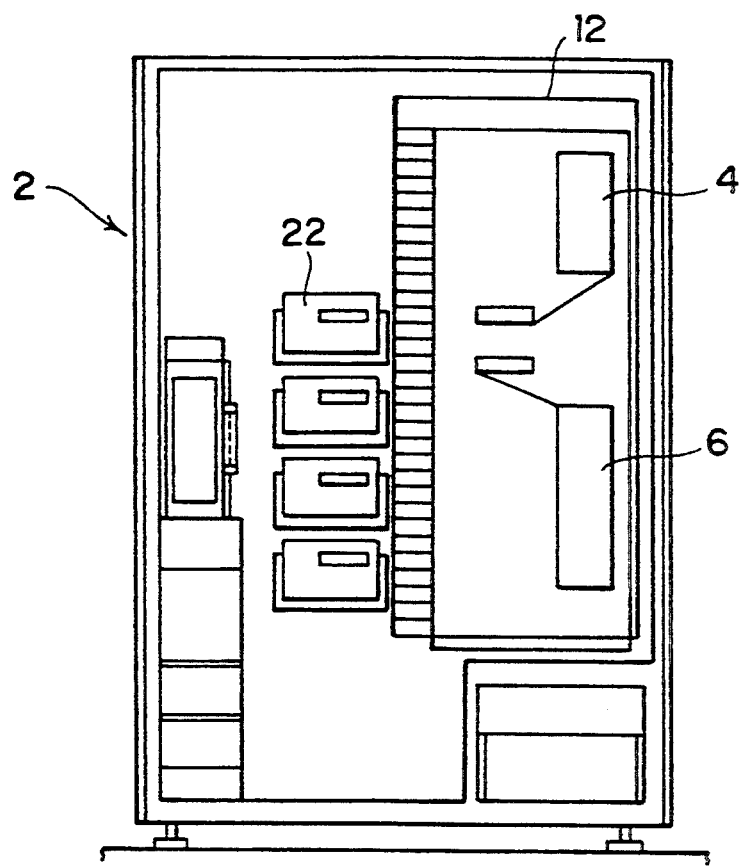
FIG. 3 is a view seen from the front side of the interior of the library apparatus of FIG. 1 and FIG. 2.
Figure 4:
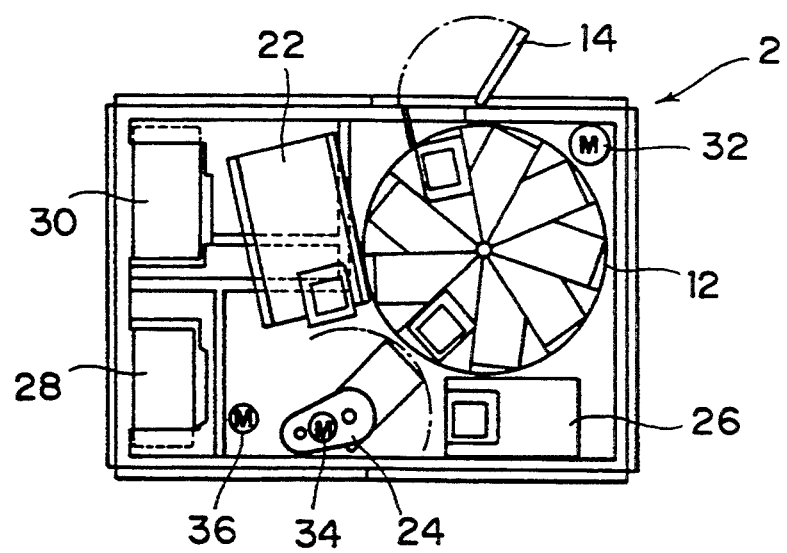
FIG. 4 is a view seen from above of the interior of the library apparatus of FIG. 1 and FIG. 2.
Figure 5:
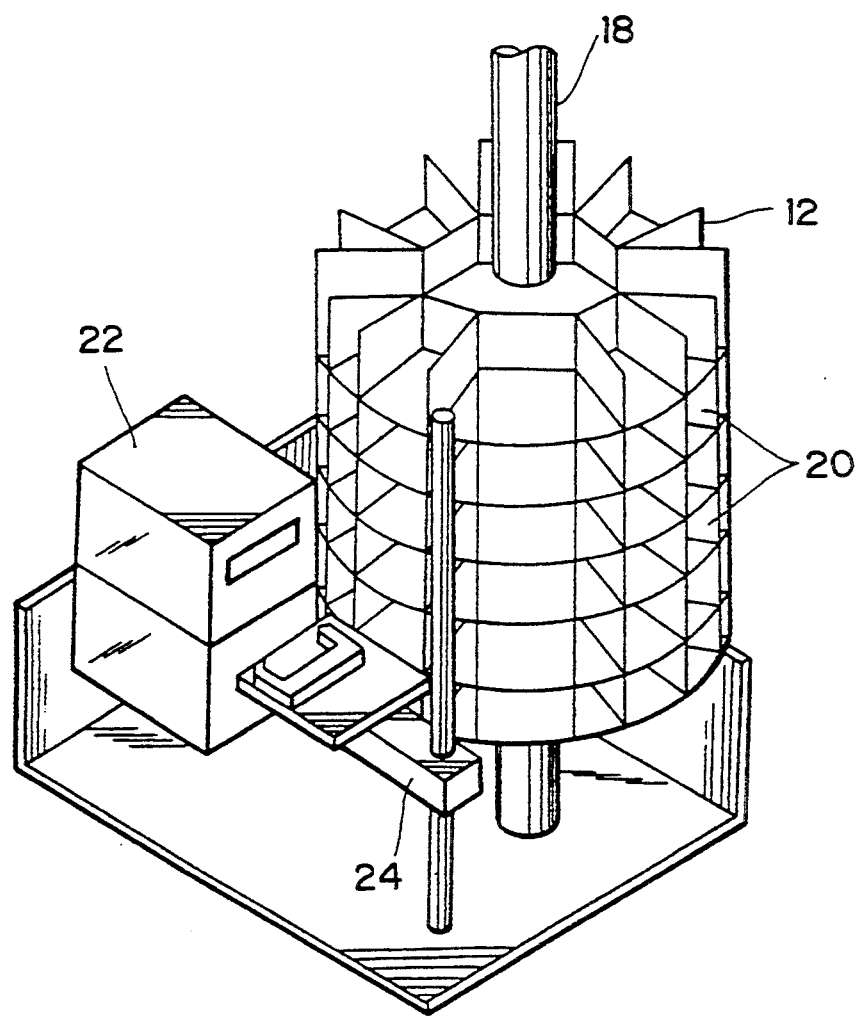
FIG. 5 is a perspective view of the main portion of the interior of the library apparatus of FIG. 1 and FIG. 2.

FIG. 3 and FIG. 4 are views seen from the front and above of the interior of the library apparatus, respectively, while FIG. 5 is a perspective view of the main portion of the interior of the library apparatus. A cell drum 12 is rotatable around a shaft 18 clockwise and counterclockwise as most clearly seen from FIG. 5. The cell drum 12 has a plurality of cells for storing the magnetic tape cartridges therein arranged at least in the circular direction. Particularly in this embodiment, the cell drum 12 has a great number of cells 20 arranged both in the circular direction and in the axial direction. For example, 9 columns of cells 20 are arranged in the circular direction and 35 tiers of them are arranged in the axial direction and, hence, the maximum number of storable cartridges is 315. Close to the cell drum 12, there are provided for example four sets of recording-/reproducing units 22 and an accessor 24. The recording/reproducing unit 22 performs recording and reproducing of data on the magnetic tape cartridge. The accessor 24 is for moving the recording medium between two members of the inlet 4, the outlet 6, the cell drum 12, and the recording/reproducing unit 22.

Referring to FIG. 4, reference numeral 26 denotes an access station communicating with the inlet 4 and the outlet 6, and reference numeral 28 denotes a robot controller for controlling the cell drum 12, the accessor 24, and the access station 26, and reference numeral 30 denotes a controller for externally controlling the library apparatus. Within the library body 2, there are provided a cell drive motor 32 for driving the cell drum 12, a swivel motor 34 and an elevator motor 36 for driving the accessor 24. A DC servomotor can be suitably used as the motors 32, 34, and 36.

When an operator place a cartridge in the inlet 4 and gives a relevant command from the operator panel 8, the cartridge is stored by the accessor 24 into a cell selected out of the cells 20 of the cell drum 12. The selection of the cell 20 is effected by rotary motion of the cell drum 12 and up-down motion of the accessor 24. Further, by giving a relevant command from the operator panel 8, the operator can have a desired cartridge picked up by the accessor 24 from the cell drum 12 and discharged from the outlet 6. When it is desired to directly charge or discharge a number of cartridges at a time, the operator, operating the operator panel 12 provided on the rear side as shown in FIG. 2 to open the door 14, can directly charge or discharge 35 reels of cartridges for one column. The recording/reproducing unit 22, under instructions given externally through the controller 30, performs such operations as erasing of stored contents that are unnecessary, writing of new contents to be stored, and reading of stored contents, on a cartridge which has been sent over from the inlet 4 or the cell drum 12.

The accessor 24 is accessible to a cell drum 12 only at a predetermined position in the circumferential direction of the cell drum 12. Accordingly, in order to bring a designated cartridge to the position to which the accessor 24 is accessible, it is required to rotate the cell drum 12 through a specified total angle of rotation and stop it at the target position. The present invention is suited for use in such drive control of the cell drum, and, for such drive control of the cell drum, various novel techniques are employed in the system of the present invention.

Figure 6:
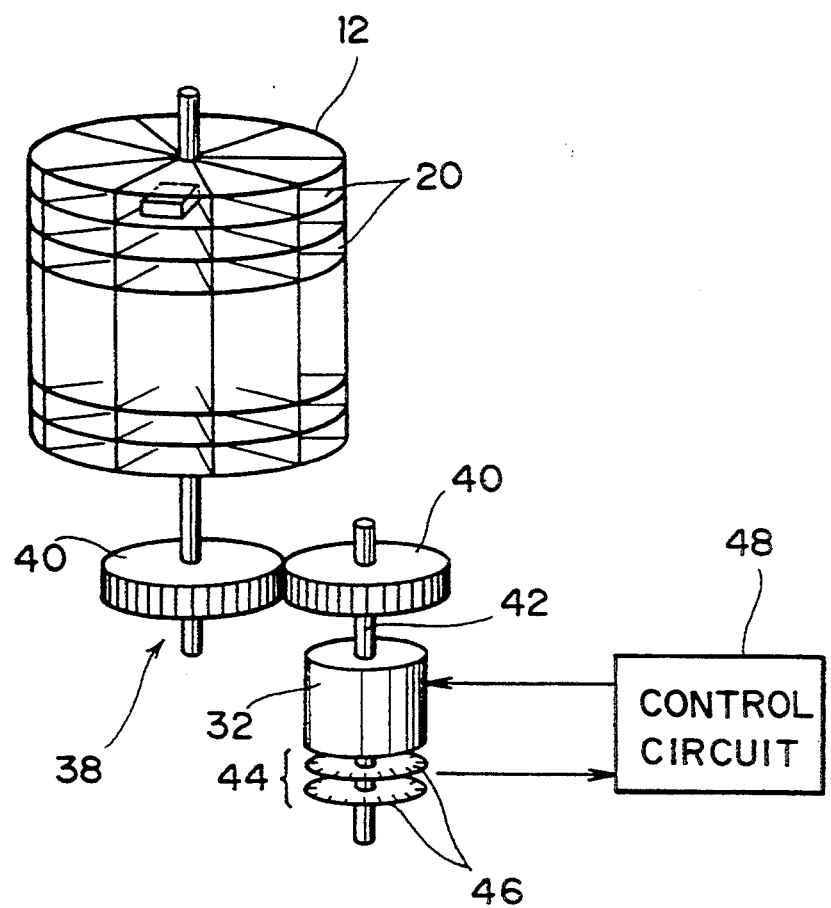
FIG. 6 is a diagram explanatory of a driving unit of a cell drum to which the present invention is applied.

FIG. 6 is a diagram explanatory of a drive unit of the cell drum to which the present invention is applied. A rotating mechanism 38 rotatably supports the cell drum 12 and also transmits the output torque of the cell drum motor 32 to the cell drum 12. The rotating mechanism 38 includes a speed change means having at least two gears 40 whereby the output torque of the motor 32 is increased and transmitted to the cell drum 12. The gear ratio of the gears 40 is for example 150:1. The shaft 42 of the motor 32 has a tachometer 44 connected thereto. The tachometer 44 outputs a signal corresponding to the rotating speed of the shaft 42. Especially in the present embodiment, the tachometer 44 is directly coupled to the shaft 42 and outputs a signal corresponding to the speed and the rotating direction. To output such a signal, the tachometer 44 is arranged in a two-phase type and has two disks 46, each of which is provided with for example 500 slits, and a photosensor not shown. The processing of the output signal of the tachometer 44 will be described later. A control circuit 48 receives the output signal of the tachometer 44 and drives the motor 32 so that the cell drum may rotate through a desired total angle of rotation. The total angle of rotation is the angle of rotation required for a desired cell selected from the cells 20 of the cell drum 12 to reach its target position.

Figure 7:
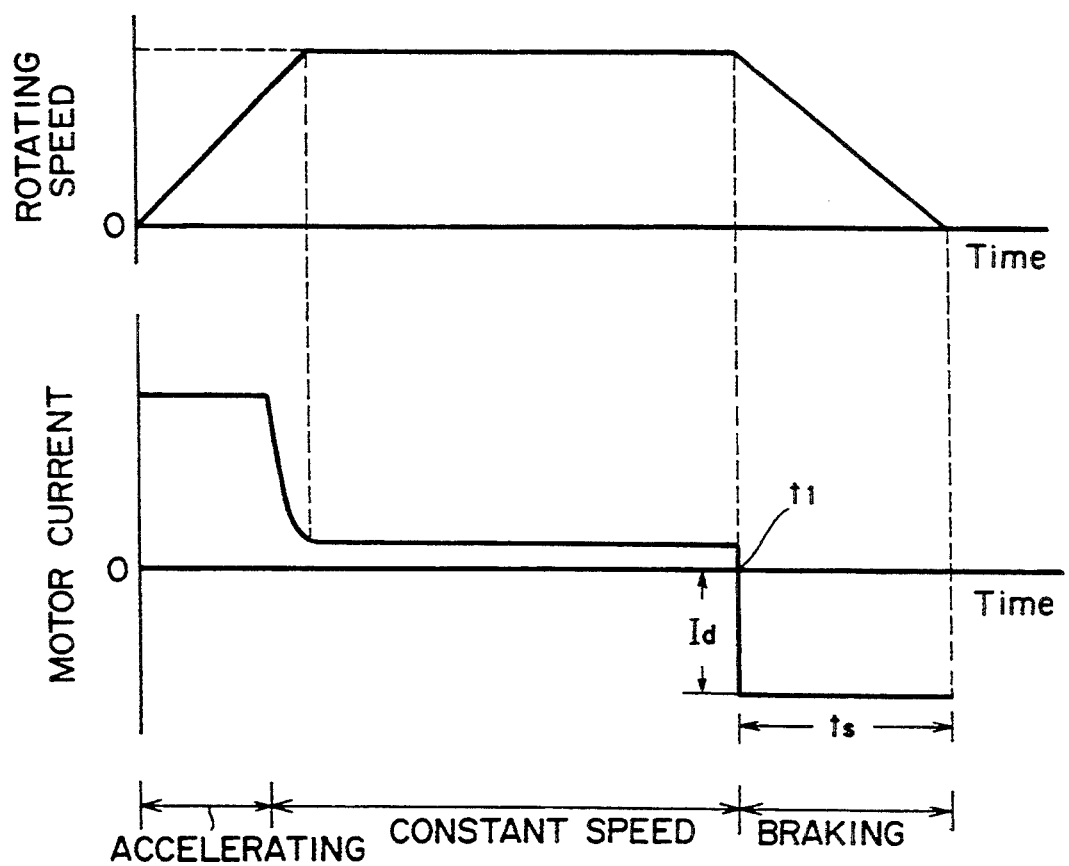
FIG. 7 is a diagram explanatory of the outline of control executed by the control circuit in FIG. 6.

FIG. 7 is a diagram explanatory of the outline of the control executed by the control circuit 48 in FIG. 6. In FIG. 7 are shown changes with time of the rotating speed and the motor current of the motor 32. In the accelerating stage, an accelerating current is supplied to the motor 32 until the cell drum 12 and the motor 32, starting from their stopped state, attain a predetermined rotating speed. The accelerating current is set up according to the inertia of the rotating portion and the friction in the related mechanism. In the constant speed stage, the motor 32 is supplied with a holding current such that the cell drum 12 and the motor 32 make a constant speed rotation with a predetermined rotating speed. The holding current is set up according to the friction. In the braking stage, a braking current Id determined according to the inertia and friction is supplied to the motor 32 for a necessary period of time $t_s$. After the motor 32 has stopped, a positioning current corresponding to a deviation is supplied to the motor 32 so that the motor 32 remains stopped at the target position. The constant speed stage may be omitted. In such a case, after the supply of the accelerating current to the motor 32 has been stopped, the supply of the braking current is immediately started without the holding current supplied. Since the motor 32 is switching-controlled by pulse width modulation (PWM) as described later and the motor 32 is supplied with a controlled pulse current, the motor current shown in FIG. 7 is not representing the current actually flowing through the motor 32 but representing a directive value of the current corresponding to the driving torque of the motor 32.

Referring to FIG. 7, $t_1$ in the time axis represents the point of time when the braking current is started to be supplied to the motor 32. The point of time $t_1$ in the present embodiment is also the point where the angle of rotation which the cell drum 12 has further to rotate until it stops, i.e., the value of angle given by subtracting the angle of rotation achieved up to that point from the total angle of rotation, has reached a predetermined value of angle. Accordingly, the accelerating current and the holding current can be set up roughly. This is because the deviation of the accelerating current or the holding current from the optimum value only causes the point of time $t_1$ to vary within its tolerance. In an extreme case, the accelerating current can be a constant value irrespective of the difference in inertia of the cell drum 12. On the contrary, the braking current must be set up with the inertia of the cell drum 12 correctly taken into account. It is because the cell drum 12 cannot be stopped at its target position or in the close vicinity of that position when the braking current is not set up accurately in accordance with the inertia. In the preferred embodiments of the present invention, several novel methods as follows are used to stop the cell drum at the target position quickly and accurately.

(1) In inputting the inertia of the cell drum varying with the number of the cartridges and weight of each of them, the inertia can be actually measured by detecting the response characteristic of the cell drum to the output torque of the motor. On the basis of this measured value, the braking current is determined.

(2) By adopting a new method in which the braking current is repeatedly corrected at predetermined timing, it is achieved to stop the cell drum at the target position or its close vicinity.

(3) By adopting a new method in which the backlash region in the gear of the rotating mechanism and others is detected, the vibration is prevented from occurring during the positioning control.

(4) A new controlling method suited to the DC servomotor is adopted.

Figure 8:
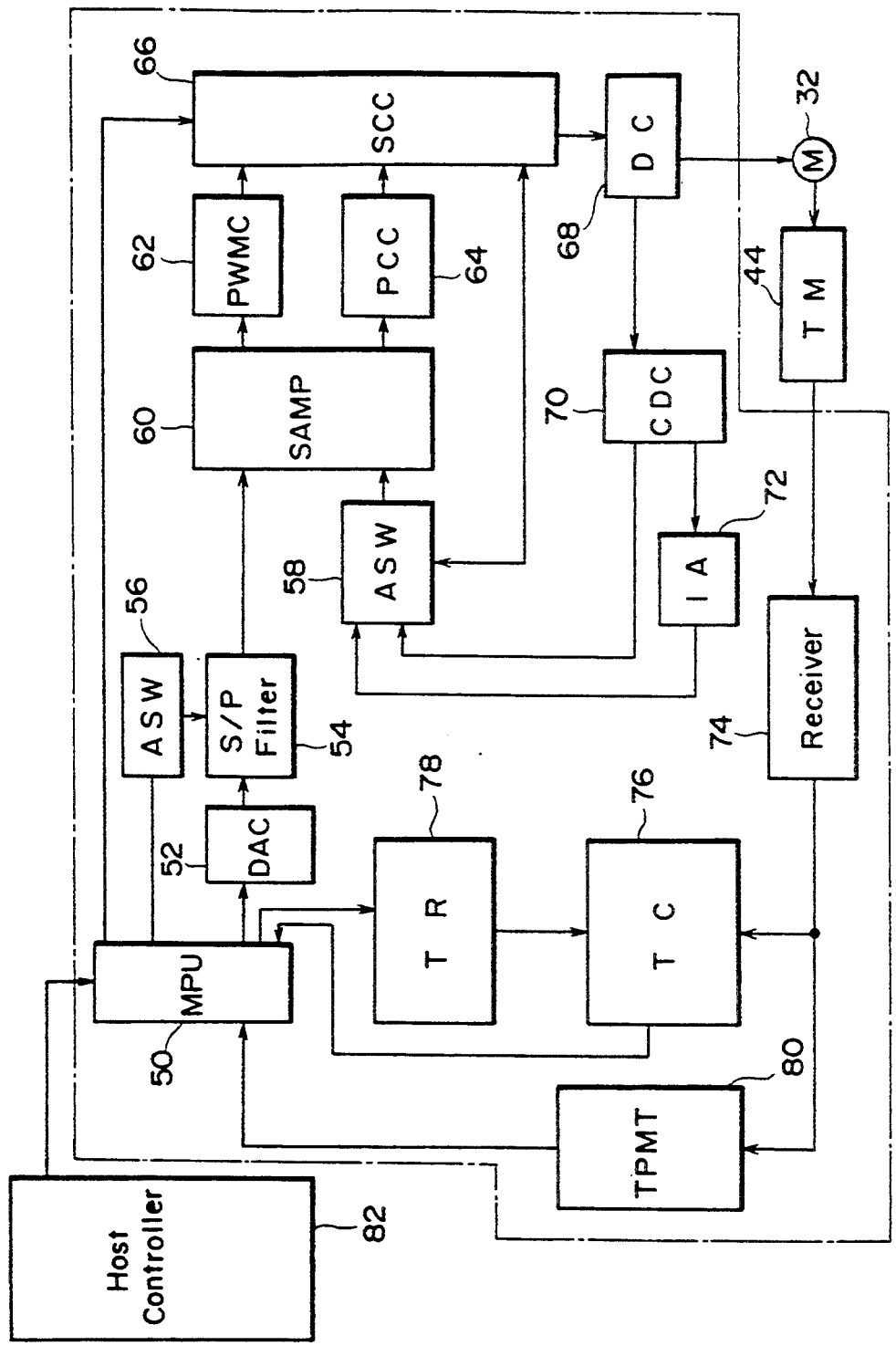
FIG. 8 is a block diagram showing a particular example of the control circuit in FIG. 6.

FIG. 8 is a block diagram showing a particular example of structure of the control circuit 48 in FIG. 6. The control circuit 48 has an MPU (microprocessor unit) 50, a DA converter 52, a speed/position filter 54, analog switches 56 and 58, a summing amplifier 60, a PMW (pulse width modulation) converter 62, a polarity discriminating circuit 64, a switching control circuit 66, a drive circuit 68, a current detecting circuit 70, an inverting amplifier 72, a receiver 74, a tachopulse counter 76, a tachopreset register 78, and a tachopulse period measuring timer 80. As the MPU 50, an MPU of 8 bits for example is used to achieve drive control of the cell drive motor 32. The MPU 50 performs accelerating/constant speed/braking operations of the motor 32 under instructions from a host controller 82. Further, the MPU 50 controls the rotating speed of the motor 32 by comparing, through digital calculation, the rotating speed of the motor 32 detected by the tachometer 44, the receiver 74, and others with a reference value and, thereupon, feeding back the result of comparison to the motor 32.

The DA converter 52 converts the digital directive value for driving the motor generated through the processing in the MPU 50 into an analog directive value of the motor current (for example voltage value). The output signal of the DA converter 52 is supplied to the speed/position filter 54. In the speed/position filter 54, either the function of the speed filter or that of the position filter is selected by the analog switch 56 under the instructions from the MPU 50. The summing amplifier 60 adds up the motor current directive value from the filter 54 and a feedback current of the motor current and supplies its output signal to the PWM converter 62 and the polarity discriminating circuit 64. The PWM converter 62 generates a pulse train for pulse driving the motor and supplies the pulse train to the drive circuit 68 through the switching control circuit 66. The repetition period of the pulse train is constant and the duty ratio is proportional to the input voltage (motor voltage directive value). The switching control circuit 66, in accordance with the signals supplied from the MPU 50, PWM converter 62, polarity discriminating circuit 64, and the analog switch 58, on/off controls the driving element (transistor) in the drive circuit 68 so that the current passed through the motor 32 is controlled. The current detecting circuit 70 connected with the drive circuit 68 detects the motor current. The output signal of the current detecting circuit 70 is directly supplied to the analog switch 58 and also supplied to the analog switch 58 after having its polarity inverted by the inverting amplifier 72. The analog switch 58, in accordance with a signal from the switching control circuit 66, selects either of the signals supplied thereto and inputs the selected signal to the summing amplifier 60. Provision of such an analog switch 58 is for the purpose of causing the output signal of the current detecting circuit 70 to be negatively fed back at all times. Function of each part will be described below in more detail.

Figure 9:
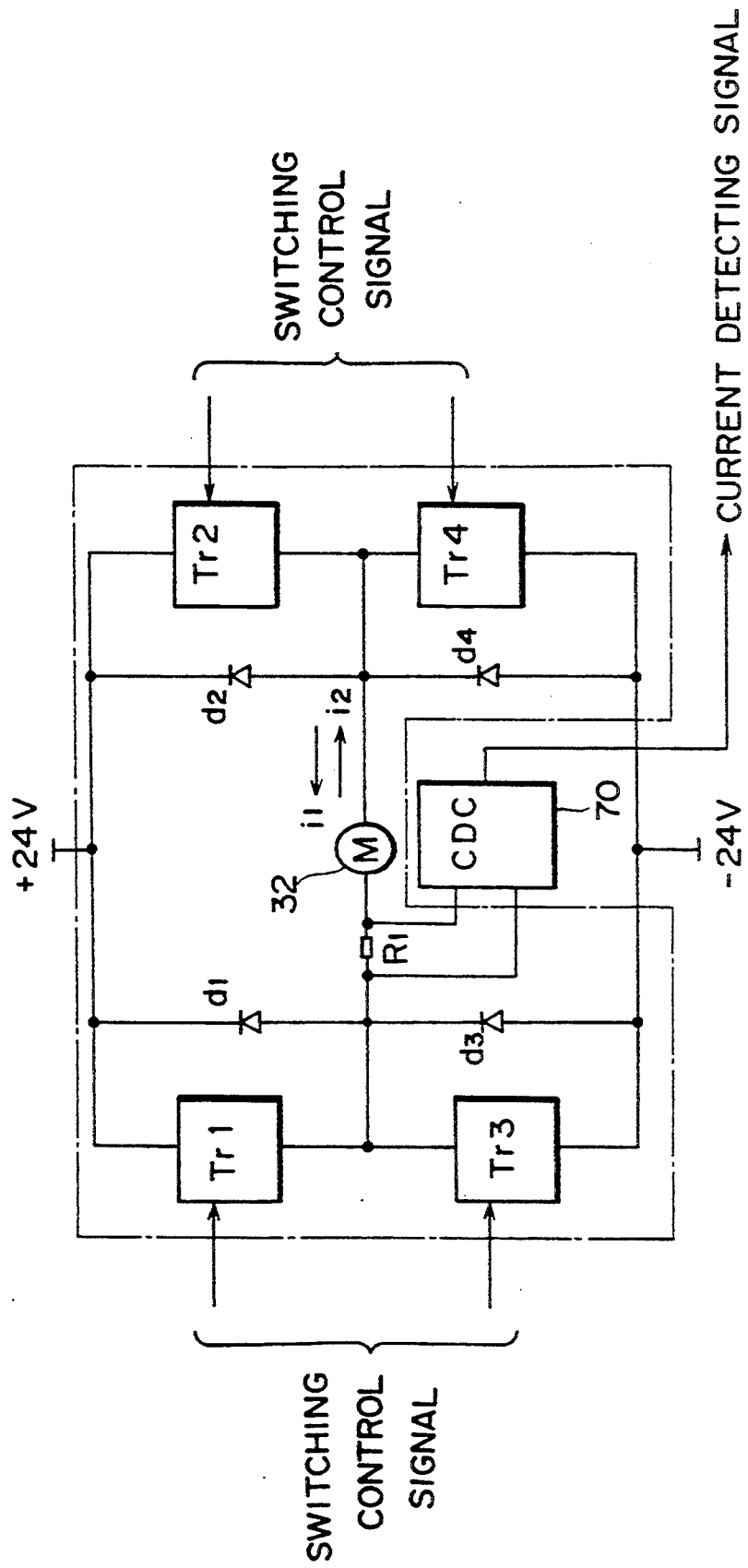
FIG. 9 is a diagram showing an example of structure of the drive circuit in FIG. 8.

FIG. 9 is a diagram showing an example of structure of the drive circuit 68 in FIG. 8. The drive circuit 68 has four transistors Tr1, Tr2, Tr3, and Tr4 for receiving switching control signal from the switching control circuit 66 (refer to FIG. 8). Between the collector and emitter of the transistors, there are inserted clamping diodes d1, d2, d3, and d4. Between the junction of the transistors Tr1 and Tr3 and the junction of the transistors Tr2 and Tr4, there is inserted a series connection of the motor 32 and a current detecting resistor R1. When the motor 32 is in its normal rotation, the transistor Tr4 is constantly held on and the transistor Tr1 is turned on/off by the switching control signal. On the other hand, when the motor 32 is in its reverse rotation, the transistor Tr2 is held constantly on and the transistor Tr3 is turned on/off by the switching control signal. When current i1 or i2 flows through the motor 32 according to the rotating direction of the motor 32, a voltage drop corresponding to the value and direction of the current flowing through the motor 32 is produced across the resistor R1. The current detecting circuit 70 amplifies the detected signal of the voltage drop across the resistor R1 and outputs it as the current detection signal.

Figure 10:
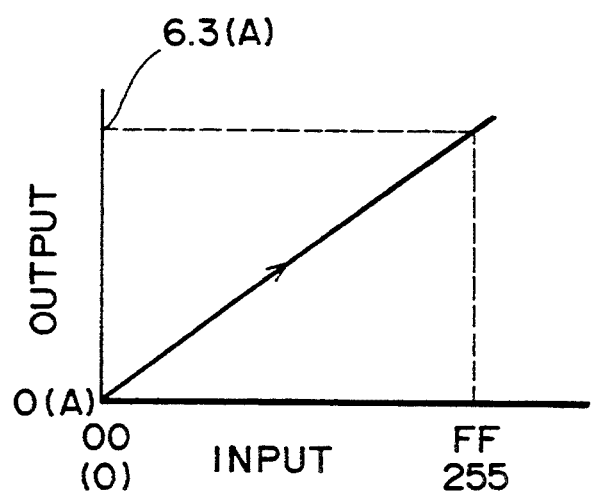
FIG. 10 is a diagram explanatory of a performance of the DA converter in FIG. 8.

FIG. 10 is a diagram explanatory of the performance of the DA converter 52 in FIG. 8. The DA converter 52 converts the digital input signal from the MPU 50 to an analog output signal. When the MPU 50 is of an 8-bit type, the directive value of the motor current is within the range between 00 and FF in hexadecimal, i.e., within the range between 0 and 255 in decimal notation. The axis of ordinates and the axis of abscissas of FIG. 10 represent the output and the input of the DA converter 52, respectively. If the motor current is 6.3 A when the input value is FF (hexadecimal), the output signal varies 25 mA against a change of one step in the input signal.

Figure 11A:
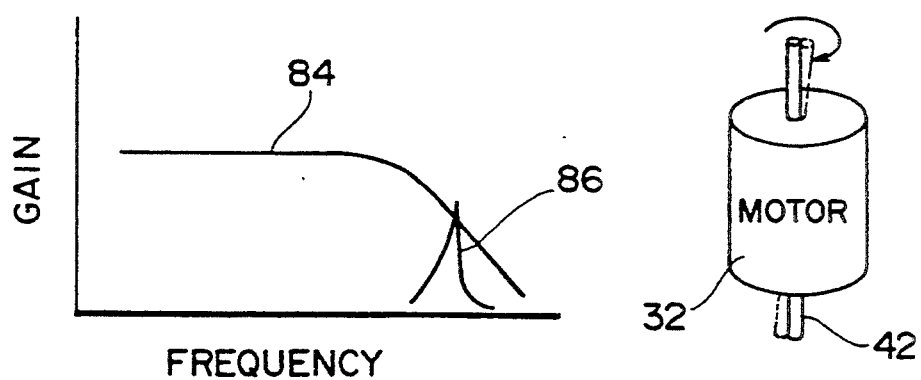
FIG. 11A and FIG. 11B are diagrams showing examples of characteristics of the speed filter and the position filter shown in FIG. 8, respectively.
Figure 11B:
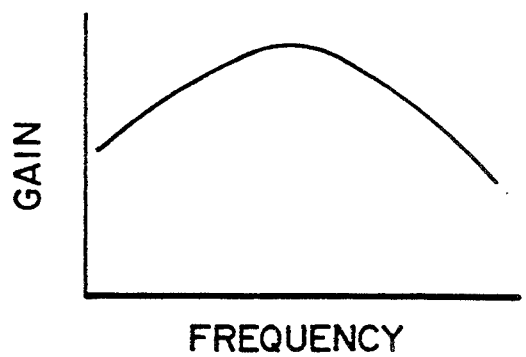

FIG. 11A and FIG. 11B are diagrams showing examples of characteristics of the speed filter and the position filter, respectively, of the filter 54 in FIG. 8. The speed filter used when the cell drum is in rotation is a low-pass filter having for example a characteristic as indicated by numeral 84 in FIG. 11A. By using the speed filter having such a characteristic, the resonance due to shaft swinging while the motor 32 is in rotation can be prevented. Numeral 86 in FIG. 11A indicates a resonance point due to shaft swinging of the motor 32. The position filter used when the cell drum is being positioned is a derivative (differential) filter having for example a characteristic as shown in FIG. 11B. By using such a position filter, the deflection of the cell drum produced in the positioning of it by external disturbance can be quickly brought to an end.

Figure 12:
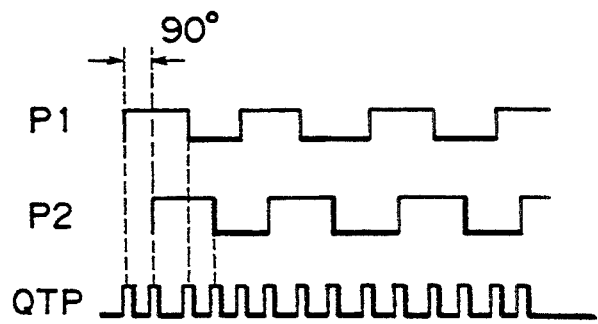
FIG. 12 is a waveform chart of the output signal of the tachometer shown in FIG. 6 and FIG. 8.

FIG. 12 is a waveform chart of the output signal of the tachometer 44 shown in FIG. 6 and FIG. 8. The tachometer 44 outputs full pulses P1 and P2 with a phase difference of 90° therebetween. Using the full pulses P1 and P2, a quarter pulse QTP is generated, which will be described below in concrete terms.

Figure 13:
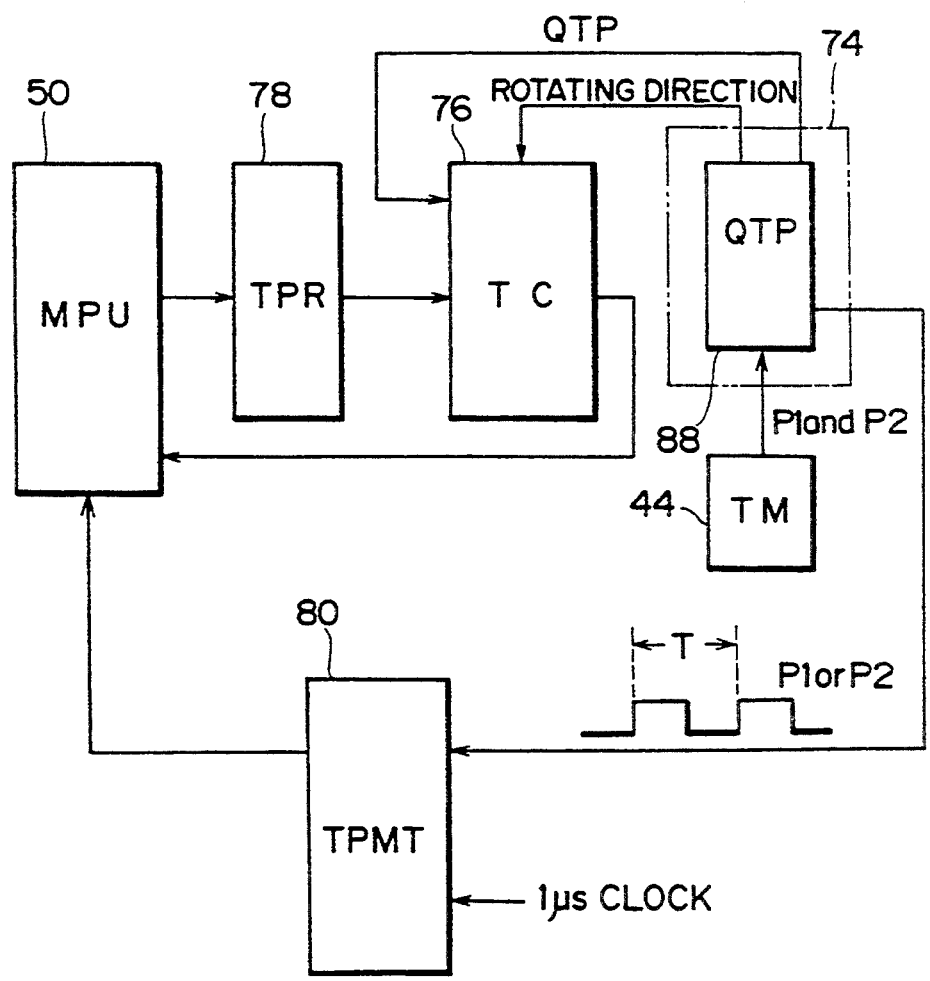
FIG. 13 is a block diagram of a portion of the control circuit shown in FIG. 8.

FIG. 13 is a block diagram of a portion of the control circuit 48 in FIG. 8. The receiver 74 has a QTP generator 88. The full pulses P1 and P2 from the tachometer 44 are supplied to the QTP generator 88. The QTP is generated at the rise and the fall of the full pulses P1 and P2. Accordingly, four quarter pulses QTP are generated in one period of the full pulse P1 (P2). The quantity of rotation of the motor 32 (refer to FIG. 6 and FIG. 8) to which the tachometer 44 is connected is proportional to the number of counts of the quarter pulses QTP, and therefore, the total angle of rotation of the cell drum 12 (refer to FIG. 6) can be set up by the number of counts of the quarter pulses QTP. Further, the rotating speed of the cell drum 12 or the motor 32 can be measured according to the period T of the full pulse P1 or P2. Furthermore, the rotating direction of the cell drum 12 or the motor 32 can be detected by the phase difference between the full pulses P1 and P2. The quarter pulse QTP and a signal bearing the information on the rotating direction are supplied from the receiver 74 to the tachopulse counter 76. In the tachopulse counter 76, the number of counts of the quarter pulse QTP is increased or decreased with the rotation of the motor 32. The MPU 50 writes a set value in the tachopreset register 78. The set value is set up in the tachopulse counter 76 as preset data. The MPU 50 reads and acknowledges the number of counts in the tachopulse counter 76. To measure the rotating speed, at least either of the full pulses P1 and P2 is supplied from the receiver 74 to the timer 80. The timer 80 is also supplied with a 1 µs clock. The timer 80 measures the period T of one cycle of the full pulse P1 or P2. The measured data is supplied to an interrupt input terminal of the MPU 50.

Figure 14A:
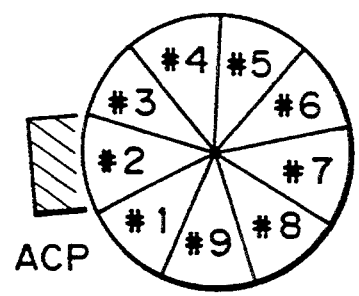
FIG. 14A and FIG. 14B are diagrams explanatory of target position setting of the cell drum.
Figure 14B:
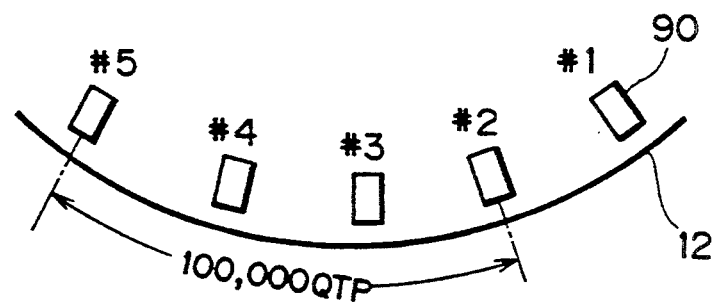

FIG. 14A and FIG. 14B are diagrams explanatory of setting of the target position of the cell drum. The cell drum 12 in the present embodiment has 9 columns (#1 to #9) of cells arranged in the circular direction as shown in FIG. 14A. Character ACP indicates accessible position of the accessor 24 (refer to FIG. 4 and FIG. 5). In a disk provided for example under the cell drum 12, as shown in FIG. 14B, there are formed cell position slits 90 corresponding to each of the columns (#1 to #9). The library apparatus has a photosensor (not shown) for detecting the slit 90. By means of the slit 90 and the photosensor, it can be decided whether or not a desired cell is located in the accessible position. Meanwhile, each of two disks 46 (refer to FIG. 6) provided for the tachometer 44 has 500 slits. In the present example, 500×4=2,000 quarter pulses QTP are generated during one rotation of the motor shaft 42 (refer to FIG. 6). Since, in the present embodiment, as shown in FIG. 6, the output torque of the motor 32 is transmitted to the cell drum 12 through the gear 40 with a gear ratio of 150:1, one accurate full rotation of the cell drum 12 corresponds to 2,000×150=300,000 quarter pulses QTP. When an instruction is issued from the host controller 82 (refer to FIG. 8) to the MPU 50 as to how many columns of the 9 columns should be rotated, the MPU 50 determines the total angle of rotation and the rotating direction to rotate the cell drum 12. The rotating direction is set up such that the total angle of rotation becomes smaller. For example, supposing that the second column #2 is located now at the accessible position ACP (refer to FIG. 14A) and it is intended to move the fifth column #5 to the accessible position ACP with the next instruction, it will be better to rotate the cell drum 12 three columns in a counterclockwise direction in FIG. 14A. Accordingly, the total angle of rotation of the cell drum 12 at this time corresponds to 300,000×3/9=1,00,000 quarter pulses QTP. If the MPU 50 sets up 100,000 quarter pulses QTP in the tachopulse counter 76 as the preset data before the cell drum 12 is driven, then the tachopulse counter 76 can recognize the present position of the cell drum 12 according as the number of counts of the quarter pulses QTP therein is decreased. The MPU 50 reads the number of counts in the tachopulse counter 76 and, when the decreasing remainder of the number of pulses reaches a predetermined number, it issues an instruction and, thereby, a braking current is started to be supplied to the motor 32. During the period before the point of time $t_1$ (refer to FIG. 7), at which the supply of the braking current is started, the controlled accelerating current and holding current are supplied to the motor 32 in order of mention and, thereby, the motor 32 is rotated acceleratedly or at a constant speed according to programmed rotating speeds. After the point of time $t_1$, a constant or negative feedback-controlled braking current is supplied to the motor 32. The braking current is set up according to the input value of the inertial of the cell drum 12. When the input value of the inertia is correct, the braking current may be a constant value, but when the input value of the inertial is not so correct, a controlled braking current is supplied to the motor 32. Once the motor 32 has stopped after supply of the braking current to the motor 32, a positioning current corresponding to a deviation of the cell drum 12 from the target position is supplied to the motor 32.

Operations for the negative feedback control of the current to be supplied to the motor 32 will be described with reference to FIG. 8. In starting the motor 32, the MPU 50 supplies a digital directive value to the DA converter 52. Then, the DA converter 52 outputs a motor current directive value formed of the analog voltage value corresponding to the directive value supplied from the MPU 50. Since the motor 32 stands still in the initial state, a negative feedback signal (correcting current) is not supplied from the current detecting circuit 70 to the summing amplifier 60 but only the directive value of the motor current is supplied to the summing amplifier 60. When the output signal of the summing amplifier 60 is supplied to the PWM converter 62, the PWM converter 62 compares the absolute value of the input signal with a reference voltage and outputs a PWM pulse train. The output pulse train is supplied to the switching control circuit 66 and a switching control signal is generated therein. When the drive circuit 68 drives the motor 32 in accordance with the switching control signal, a motor current is passed through the motor 32 and the motor 32 is started to rotate. The motor current is detected by the current detecting circuit 70 and fed back to the summing amplifier 60. The analog switch 58 switch selects one of the two input signals according to the signal from the switching control circuit 66 and supplies the selected signal to the summing amplifier 60 as the feedback signal. At this time, in order that negative feedback control is executed at all times, the analog switch 58 operates so that the feedback signal becomes a negative signal. The summing amplifier 60 adds the negative feedback signal to the positive motor current directive value and outputs the sum signal. The PWM converter 62, when the motor current is smaller than the motor current directive value, increases the duty ratio of the PWM pulse train and, on the contrary, when the motor current is larger than the motor current directive value, decreases the duty ratio of the PWM pulse train.

When the inertia of the cell drum 12 is relatively great, the accelerating current and the braking current should be increased. When the friction in the rotating mechanism (refer to FIG. 6) and the like is relatively great, the accelerating current and the holding current should be increased and the braking current should be decreased. While the value of the friction is virtually constant at all times, the inertia of the cell drum 12 varies with the number of the magnetic tape cartridges stored therein and the weight of each of them. Accordingly, it is required to input the correct value of the inertia in order to stop the cell drum 12 correctly at the target position or at the position in its close vicinity. The inertia to be input may be obtained by calculation, or the inertia may be directly measured by the later described new method and the measured value may be input. The accelerating current and the braking current, especially the braking current, to be supplied to the motor 32 are set up depending on the value of the input inertia.

Generally, the generated torque $T_M$ by a motor is expressed, using the torque constant $K_T$ and the motor current I, as $$T_M = K_T \cdot I.$$

Between the torque $T_M$ and the inertia J, there is the following relationship $$T_M = (J \cdot a\omega)/G + T_C.$$

where $a\omega$ represents the angular acceleration, G represents the gear ratio, and $T_C$ represents the friction torque. The gear ratio G is a value inherent to the apparatus and the friction torque $T_C$ is a value easily measured with the rotating portion. Therefore, in setting up the braking current I (corresponding to Id in FIG. 7) for providing a predetermined negative angular acceleration $a\omega$ required in the braking stage, it is required to input an accurate value of the inertia J.

One of the effective methods of inputting the inertia of the cell drum is to manage the number of the magnetic tape cartridges put into and out of the cell drum. As calculating equation in this case, the following one for example can be used $$J = (M_C + N \cdot M_G) \cdot R^2/2,$$

where $M_C$ represents the weight of the cell drum proper, N represents the number of magnetic tape cartridges stored in the cell drum, $M_G$ represents the weight for one cartridge, and R represents the effective radius of the cell drum. A more effective method of inputting the inertia includes direct measurement of the inertia. In the present invention, a novel method is employed in the direct measurement of the inertia.

Figure 15:
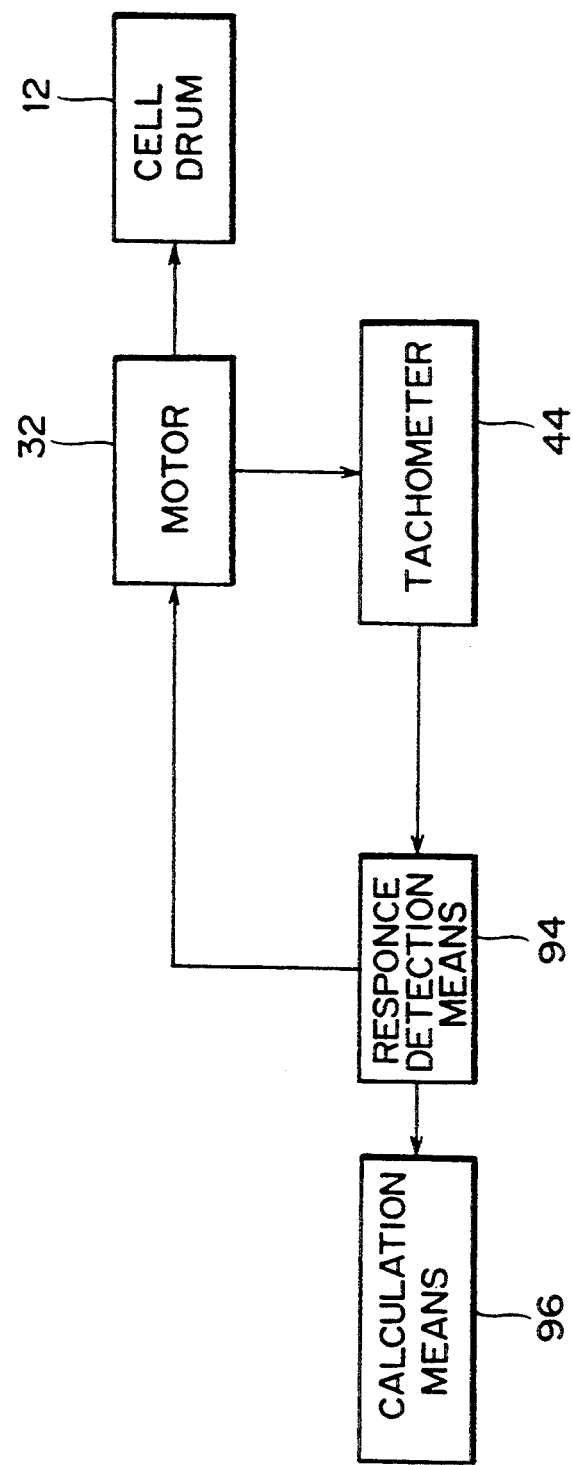
FIG. 15 is a block diagram of an inertia measurement apparatus applicable to the library system of the invention.

FIG. 15 is a block diagram of an inertia measurement apparatus applied to the library system of the present invention. A response detection means 94 detects, on the basis of the output signal of the tachometer 44, the response characteristic of the cell drum 12 obtainable against a predetermined value of the output torque of the motor 32. The calculation means 96 calculates the inertia of the cell drum 12 on the basis of the output of the response detection means 94. The response detection means 94 and the calculation means 96 may be realized, for example, by software using the MPU 50 and the host controller 82 in FIG. 8.

An accurate value of the inertia can be easily obtained by directly measuring the inertia in the above described way. For example, when the inertia is calculated having the number of magnetic tape cartridges stored in the cell drum only managed, the calculated value of the inertia sometimes becomes inaccurate as against the real value because the weight of the cartridges is different according to their types (long-time type, short-time type). When inaccurate inertia is input, the desired cell, in the braking stage of the cell drum, overshoots the target position or stops short of the target. Accordingly, such difficulties occur that it takes a long time before the cell is stopped at the target position, or vibration of the cell drum is induced during the positioning control of the cell drum. Those difficulties can be overcome by using the measuring apparatus shown in FIG. 15. An example of operation of the apparatus of FIG. 15 will be described below in concrete terms.

The response characteristic of the cell drum can be obtained by supplying a step current to the motor such that the speed of the cell drum varies with time from its predetermined initial speed. The obtainable response characteristic relates for example to the rate of change with respect to time of the angle of rotation, or the rotating speed, of the cell drum or the motor, at a point when a predetermined period of time elapsed after the rise of the step current. It is preferred that the amplitude of the step current is constant and the initial speed of the cell drum is set at zero. The reason why measurement of the inertia is possible by supplying a step current of a constant amplitude to the motor is because there is the following underlying principle. The angular acceleration $a\omega$ in the above mentioned equation corresponds to second-order differential coefficient with respect to time of the angle of rotation $\theta$. Accordingly, specifically when the initial velocity is zero and a constant acceleration is applied, inertia J is given by $$J = (K_T I_M \cdot t^2)/2\theta,$$

where $I_M$ represents the value of the constant step current and t represents the time elapsed after the rise of the step current. The inertia can also be obtained, by using $\theta'$ as the first-order differential coefficient with respect to time of the angle of rotation $\theta$, from $$J = (K_T I_M \cdot t)/\theta'.$$

To facilitate the digital signal processing, it is arranged in the present embodiment such that inertia J is obtained by using $\Delta\theta/\Delta t$, the rate of change of the angle of rotation during an infinitesimal time $\Delta t$, which is virtually equal to $\theta'$, the differential coefficient with respect to time of the angle of rotation. The step current is supplied to the motor 32 for example under the instructions from the MPU 50 in FIG. 8.

Figure 16:
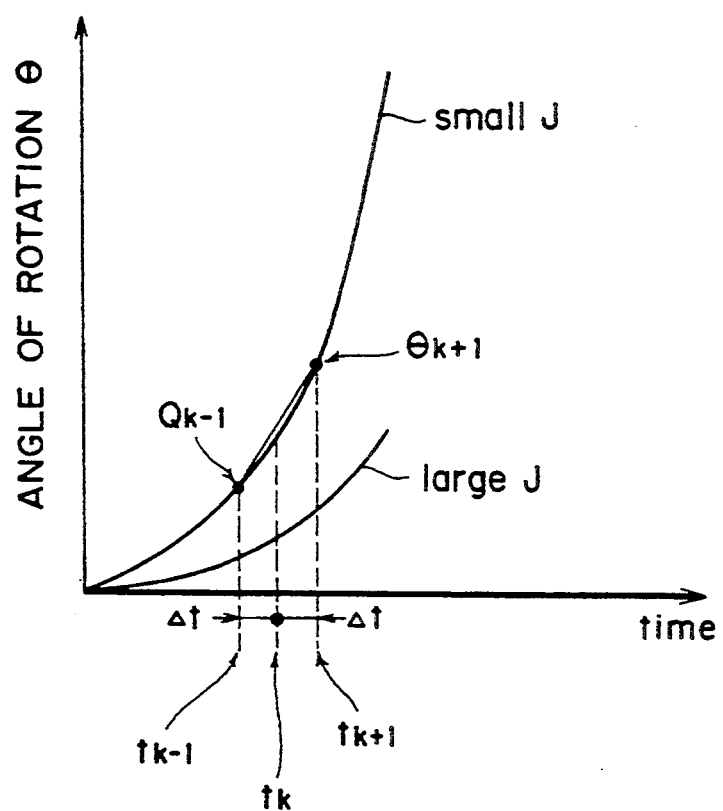
FIG. 16 is diagram showing examples of response characteristics of the cell drum when a step current is passed through the motor.

FIG. 16 is a graph showing examples of response characteristics of the cell drum 12 when a step current is passed through the motor 32. In the graph, the axis of ordinates represents the angle of rotation $\theta$ of the motor 32 or cell drum 12 and the axis of abscissas represents the time elapsed after the rise of the step current. At a given point of time $t_k$, there is a certain relationship between the rate of change of the angle of rotation $\theta$, $\Delta\theta/\Delta t$, and the inertia J. The rate of change of the angle of rotation $\Delta\theta/\Delta t$ at $t_K$ can be obtained, by using for example the angle of rotation $\theta_{K+1}$ at $t_{K+1}$ ($t_K < t_{K+1}$) and the angle of rotation $\theta_{K-1}$ at $t_{K-1}$ ($t_{K-1} < t_K$), from $$\Delta\theta/\Delta t = (\theta_{K+1} - \theta_{K-1})/2\Delta t.$$

Figure 17:
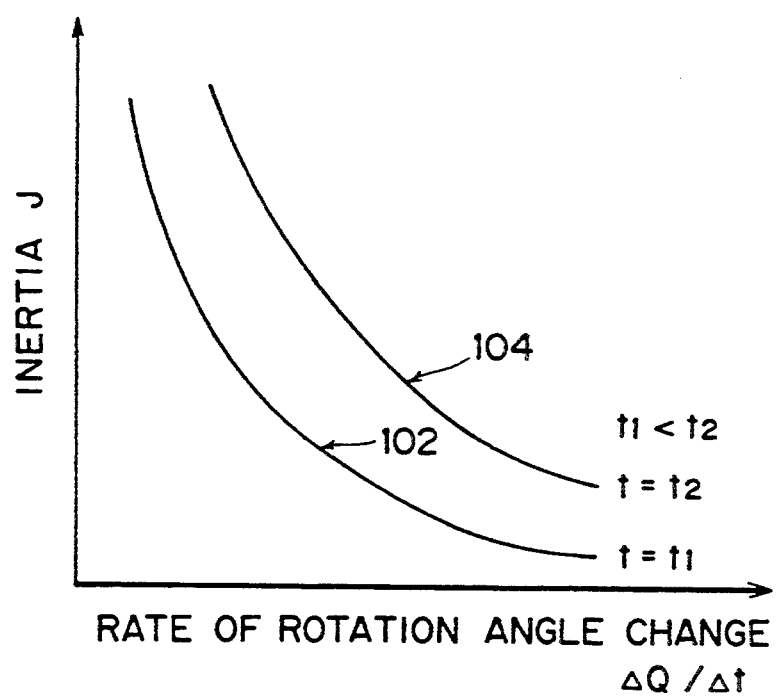
FIG. 17 is a graph showing relationships between inertia J and rate of change of angle of rotation $\Delta\theta/\Delta t$.

FIG. 17 is a graph showing relationships between inertia J and rate of change of the angle of rotation $\Delta\theta/\Delta t$. The curve denoted by numeral 102 shows the relationship at the point of time when time $t_1$ elapsed after the rise of the step current, while the curve denoted by numeral 104 shows the relationship at the point of time when the time $t_2$ ($t_1 < t_2$) elapsed after the rise of the step current. In both curves for $t_1$ and $t_2$, the inertia becomes smaller as the rate of change of the angle of rotation $\Delta\theta/\Delta t$ becomes larger. Further, the curve is shifted upward as the time elapsed after the rise of the stepped current increases. In the present embodiment, two-dimensional maps relating the rate of change of the angle of rotation $\Delta\theta/\Delta t$ and the inertia J with each other are prepared in advance for a plurality of points of time (for example $t_1$ and $t_2$), and such two-dimensional maps are stored by the MPU 50 (refer to FIG. 8) in a memory, not shown. The reason why the two-dimensional map is prepared for each of the points of time is because the inertia J can be measured accurately by subjecting the rates of change at each of the points of time to an averaging process. By the use of such two-dimensional maps, the inertia can be easily obtained without making direct calculation. Of course, it may be well to obtain the inertia J by calculation without using such two-dimensional maps. It may also be well to obtain the inertia from the rate of change of the angle of rotation at one point of time.

Figure 18:
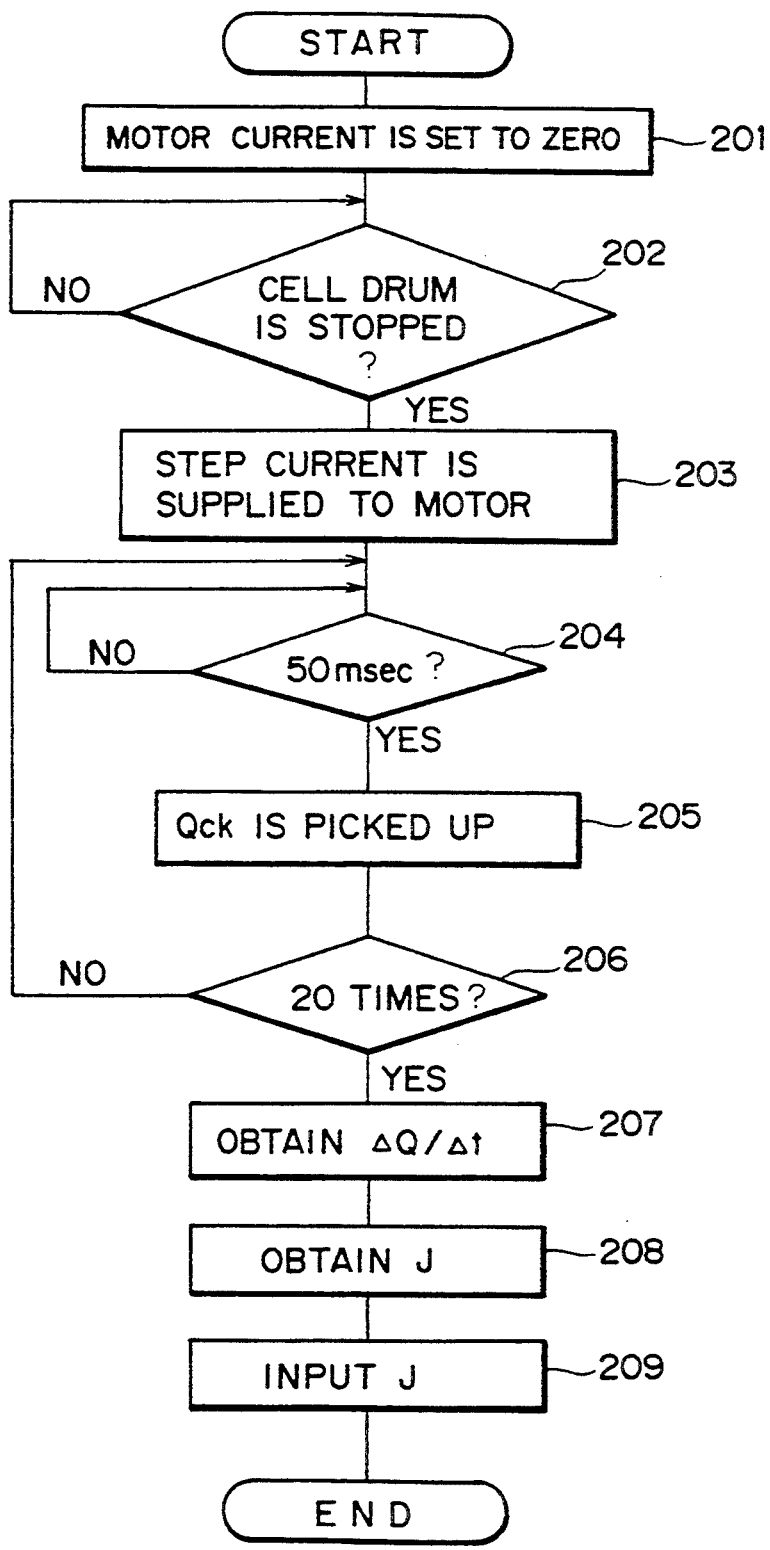
FIG. 18 is a flow chart showing an example of inertia measuring routine.

FIG. 18 is a diagram showing an example of flow chart of inertia measuring routine. In step 201, to keep the motor 32 stopped, the motor current is set to zero. In step 202, it is checked whether or not the cell drum 12 is stopped and waits until it comes to a standstill. In step 203, a step current for measuring inertia is supplied to the motor 32. In the following steps 204 to 206, in order to obtain the response characteristic of the cell drum 12 to the step current, the number of counts $Q_{CK}$ of the tachocounter 76 directly proportionate to the angle of rotation $\theta$ is measured a predetermined number of times (20 times in the present example) at intervals of a predetermined period of time (50 ms in the present example). The angle of rotation $\theta_K$ at a point of time $t_K$ is expressed as $\theta_K = K_Q \cdot Q_{CK}$ where $K_Q$ is a proportional constant. In the step 204, the time interval (50 ms) for the tachopulse counter 76 to determine the timing for counting the quarter pulses QTP (refer to FIG. 12) is generated. In the step 205, the number of counts $Q_{CK}$ of the tachopulse counter 76 is picked up (K is any integer from 1 to 20 in the present example). In the step 206, it is checked whether or not the number of counts $Q_{CK}$ has been picked up 20 times. When the picking up of the number of counts 20 times has not been completed, the flow of routine returns to the step 204 and then the steps 204 to 206 are executed again. When it is decided that the picking up of the number of counts has been completed in the step 206, step 207 is followed. In the step 207, the rates of change of the angle of rotation $\Delta\theta/\Delta t$ at each of the points of time are obtained from the picked up numbers of counts $Q_{CK}$. For example, the rate of change of the angle of rotation $\Delta\theta/\Delta t$ at a point of time $Q_K$ is given by $$\Delta\theta/\Delta t = (\theta_{CK+1} - \theta_{CK-1}) \cdot K_Q/2\Delta t.$$

Then, in step 208, the inertia J is obtained using the rates of change of the angle of rotation $\Delta\theta/\Delta t$. The above described two-dimensional maps are used in the step 208. Finally, in step 209, the obtained value of the inertia J or data indicative of this value is input to the MPU 50 (refer to FIG. 8) and the value of the braking current to be supplied to the motor 32 is determined.

In the present example, the step current is supplied to the motor 32 such that the rotating speed of the cell drum 12 increases from zero. Otherwise, setting the initial speed of the cell drum 12 to a finite value other than zero, a step current may be supplied to the cell drum 12 such that the rotating speed of the cell drum 12 increases or decreases from the initial state. Further, although the inertia is obtained in the present example by using the rate of change of the angle of rotation with respect to time, the inertia may be obtained from the rate of change of the rotating speed. In such case, it may be appropriate to measure the rotating speed according to the period of the full pulse (refer to FIG. 12) output from the tachometer 44. According to the present embodiment as described above, since the inertia of the cell drum can be measured with precision, it is made possible, by inputting the accurate value of the inertia, to stop the cell drum at the target position or its close vicinity quickly. Further, there is no possibility of vibration occurring in the positioning control of the cell drum.

Another effective method related to inputting the inertia will be described below. In this method, not only the accelerating current and the holding current supplied to the motor 32 are negative-feedback controlled but also the braking current is negative-feedback controlled. In the negative feedback of the braking current, the feedback loop shown in FIG. 8 is used and a correcting current is added to the set value of the motor current in the braking stage.

Figure 19:
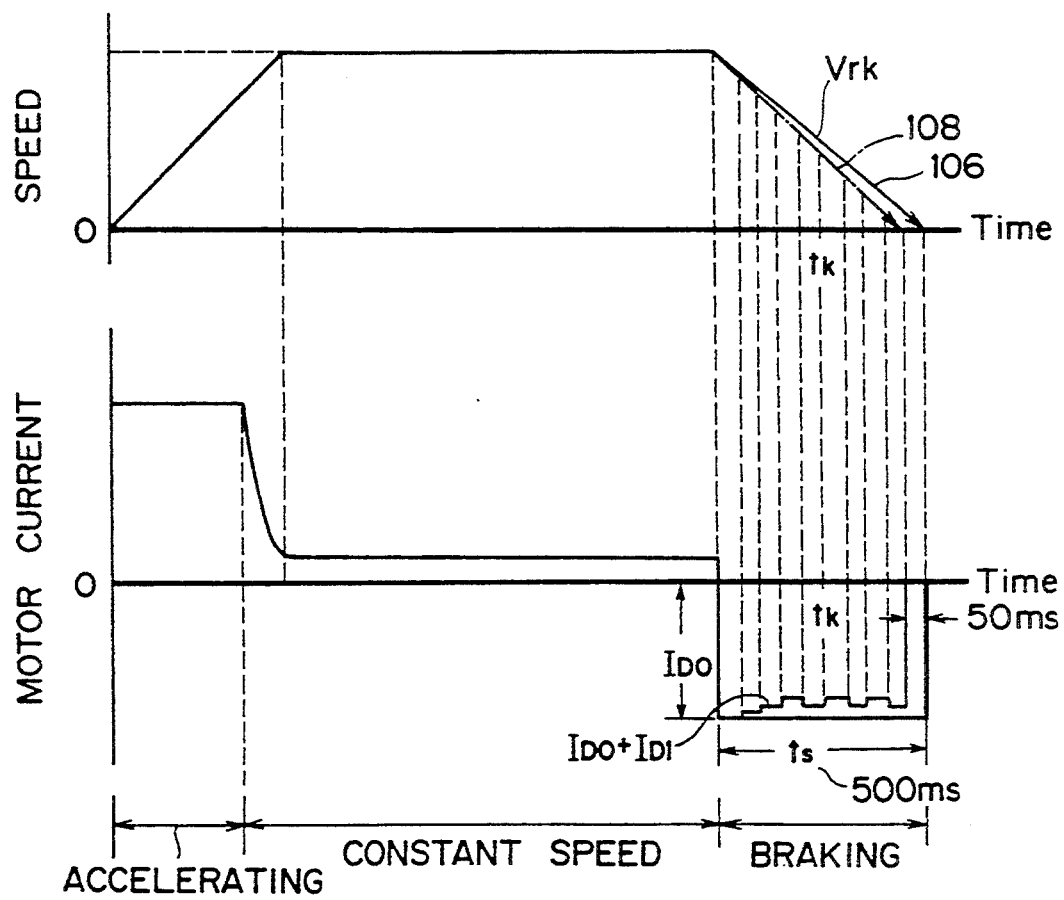
FIG. 19 is a diagram explanatory of negative feedback controlling operation in the braking stage.

FIG. 19 is a diagram explanatory of the negative feedback controlling operation in the braking stage. If the input value of the inertia J is as accurate as that obtained, for example, by direct measurement, the braking is performed along the preset reference speed indicated by the solid line denoted by reference numeral 106 even with a constant flow of braking current $I_{D0}$ (corresponding to Id in FIG. 7). In the present embodiment, the error signal corresponding to the difference between the reference speed $V_{rk}$ and the actual rotating speed is generated and the correcting current $I_{D1}$ corresponding to the magnitude of the error signal and its sign is added to the braking current $I_{D0}$. The relative operations will be described below in concrete terms.

Figure 20:
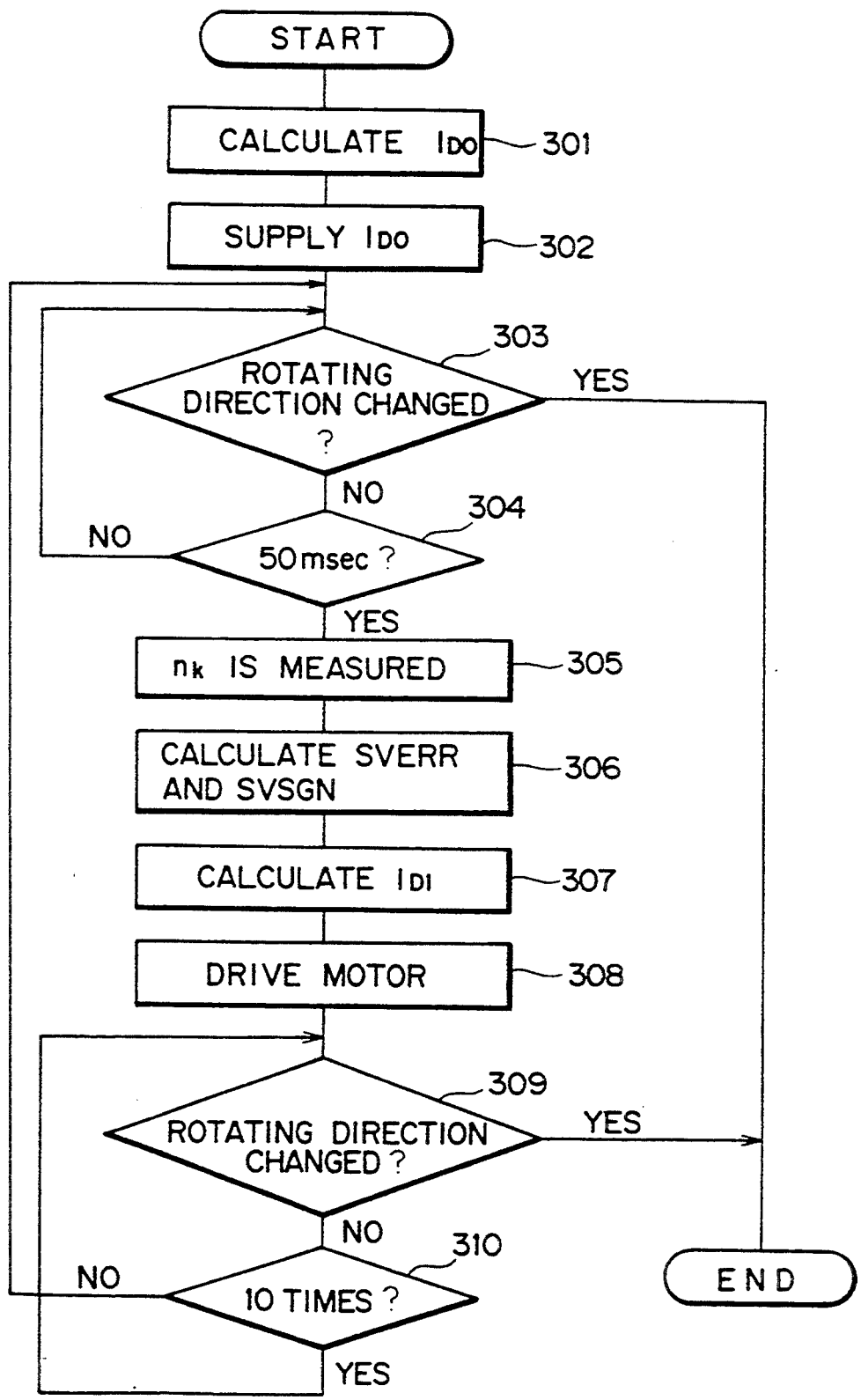
FIG. 20 is a flow chart for performing the operations shown in FIG. 19.

FIG. 20 is a flow chart of braking routine for performing the operations shown in FIG. 19. In the present braking routine, as shown in FIG. 19, the expected braking time $t_s$ (for example 500 ms) is equally divided (for example by 10) and the rotating speed of the motor 32 is repeatedly measured at intervals of the thus obtained fixed period of time (50 ms). Thus, the braking current is controlled so that the rotating speed of the motor 32 may agree with the reference speed $V_{rk}$ at each of the measurement points of time $t_k$ (k is any integer from 1 t 10 in this example). The braking routine is started when the number of counts of the quarter pulses QTP which decreases with the rotation of the cell drum 12 reaches a predetermined number, for example 5,000. In step 301, the initial value $I_{D0}$ of the braking current is calculated on the basis of the input value of the inertia J and the friction. In step 302, the motor 32 is driven to rotate according to the directive value of the calculated braking current $I_{D0}$. In step 303, it is decided whether or not the motor has started reverse rotation. When the motor 32 has started reverse rotation, this routine is ended. When it has not started reverse rotation, step 304 is followed. In steps 304 to 306, the period of the full pulse of the tachometer 44 is measured and, thereupon, an error in period between the reference period $n_{rk}$ and the period $n_k$ of the full pulse of the tachometer 44 at each measurement point of time $t_k$ during the expected braking period of time $t_s$, corresponding to the error in speed between the reference speed $V_{rk}$ and the actual rotating speed of the motor 32 at each measurement point of time $t_k$, is calculated. In the step 304, the time interval of 50 ms, i.e., the division of the expected braking period of time $t_s$ equally divided by 10, at intervals of which the period of the full pulse of the tachometer 44 is to be measured, is counted. In the step 305, the period $n_k$ of the full pulse of the tachometer 44 at the point of time $t_k$ (k is any integer from 1 to 10) measured by the tachopulse period measuring timer 80 is read. In the step 306, the read period $n_k$ of the full pulse and the reference period $n_{rk}$ are compared and the absolute value of the difference therebetween $n_{rk} - n_k$ is obtained as the error in period SVERR and the sign of $n_{rk} - n_k$ is obtained as SVSGN. In step 307, the correcting current $I_{D1}$ corresponding to the above obtained error in period SVERR is calculated. As a consequence of the foregoing, the value of the correcting current $I_{D1}$ becomes that corresponding to the error between the reference speed and the actual rotating speed. According to experiments conducted by us, the optimal value of the correcting current was confirmed to be the error in period SVERR multiplied by the inertia J with the sign SVSGN attached thereto. When the rotating speed of the motor 32 is smaller than the reference speed, it becomes such that $n_{rk} - n_k < 0$ and the correcting current $I_{D1}$ becomes a negative value. Hence, correction is made to increase the rotating speed. On the contrary, when the rotating speed of the motor 32 is larger than the reference speed, it becomes such that $n_{rk} - n_k > 0$ and the correcting current $I_{D1}$ becomes a positive value. Hence, correction is made to decrease the rotating speed. In step 308, the motor 32 is driven with the directive value of the corrected braking current $I_{D0} + I_{D1}$. As a result, the rotating speed of the motor 32 is corrected to come closer to the reference speed $V_{rk}$ at that point of time $t_k$. In step 309, it is decided whether or not the motor 32, after its rotating speed became zero, has started to rotate reversely. When the motor 32 has started to rotate reversely, this routine is ended. When the motor 32 has not started to rotate reversely, step 310 is followed. In the step 310, it is decided whether or not the period $n_k$ of the full pulse of the tachometer 44 has been measured a predetermined number of times (10 times in the present example). When the measurement has not been completed, the flow of routine returns to the step 303 to make measurement once more. When, it is decided in the step 310 that the measurement has completed, this routine is ended.

The chain line denoted by numeral 108 in FIG. 19 shows the speed-reduced state of the motor 32 when no correction of the braking current was made. The state shown is correspondent to the case where the rotating speed becomes lower than the reference speed for such reason that the input value of the inertia J was larger than the actual inertia. In this case, the cell drum 12 stops at a position short of the target and, hence, it takes an extra time to bring the cell drum 12 to the target position and, sometimes, vibration is produced in the positioning control of the cell drum 12. In the braking routine of the present embodiment, the braking current is corrected according to the difference between the actual rotating speed and the reference speed at successive intervals and, hence, the braking operation is performed along the predetermined reference speed indicated by the solid line 106 in FIG. 19. As a result, the cell drum 12 quickly stops at the target position or at its close vicinity. The expected braking time $t_s$, the time interval $t_k$ of measurement, and number of times of measurement can be appropriately changed. Although, in the present embodiment, the correcting current is obtained by using the period of the full pulse of the tachometer 44, the correcting current may be obtained by directly measuring the rotating speed of the motor 32 or the cell drum 12 and, thereupon, using the measured value.

Figure 21:
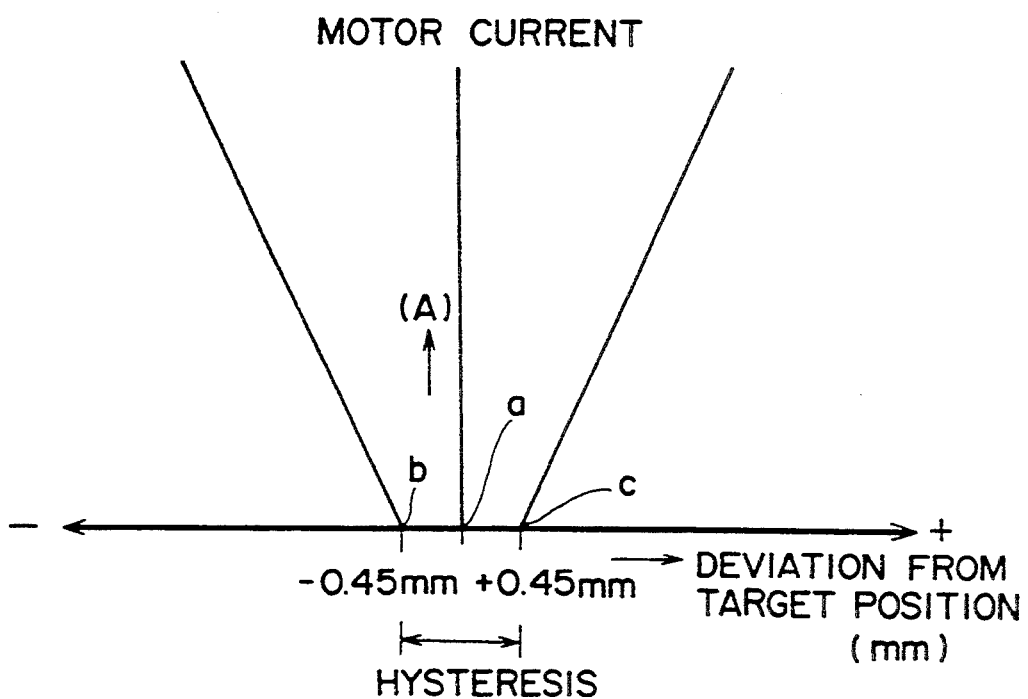
FIG. 21 is a graph explanatory of positioning currents supplied to the motor.

Now, the positioning control of the cell drum after the supply of the braking current to the motor has been stopped will be described. FIG. 21 is a graph explanatory of the positioning current to be supplied to the motor. In the graph, the axis of ordinates represents the directive value of the positioning current (motor current) and the axis of abscissas represents the deviation of the cell drum from the target position. When the rotating mechanism (refer to FIG. 6) includes gears 40, it is required in the positioning control to take the backlash region of the gears into consideration. This is because, if a motor current flows in the backlash region, there is produced vibration in most cases. In the example shown in FIG. 21, the amount of the backlash of the gears 40 is measured in advance and a hysteresis width H is set up according to the amount of the backlash. Within the hysteresis, the motor current is zero, and in the outside of the hysteresis, the motor current increases as the positional deviation increases. Referring to FIG. 21, reference character a denotes the center of the position slit (refer to FIG. 14B) and the interval between b and c represents the hysteresis width. For example the distance between the point b whose deviation from the normal stopping position (the center of the position slit) is −0.45 mm and the point c whose deviation is +0.45 mm is set to be the hysteresis width.

Figure 22:
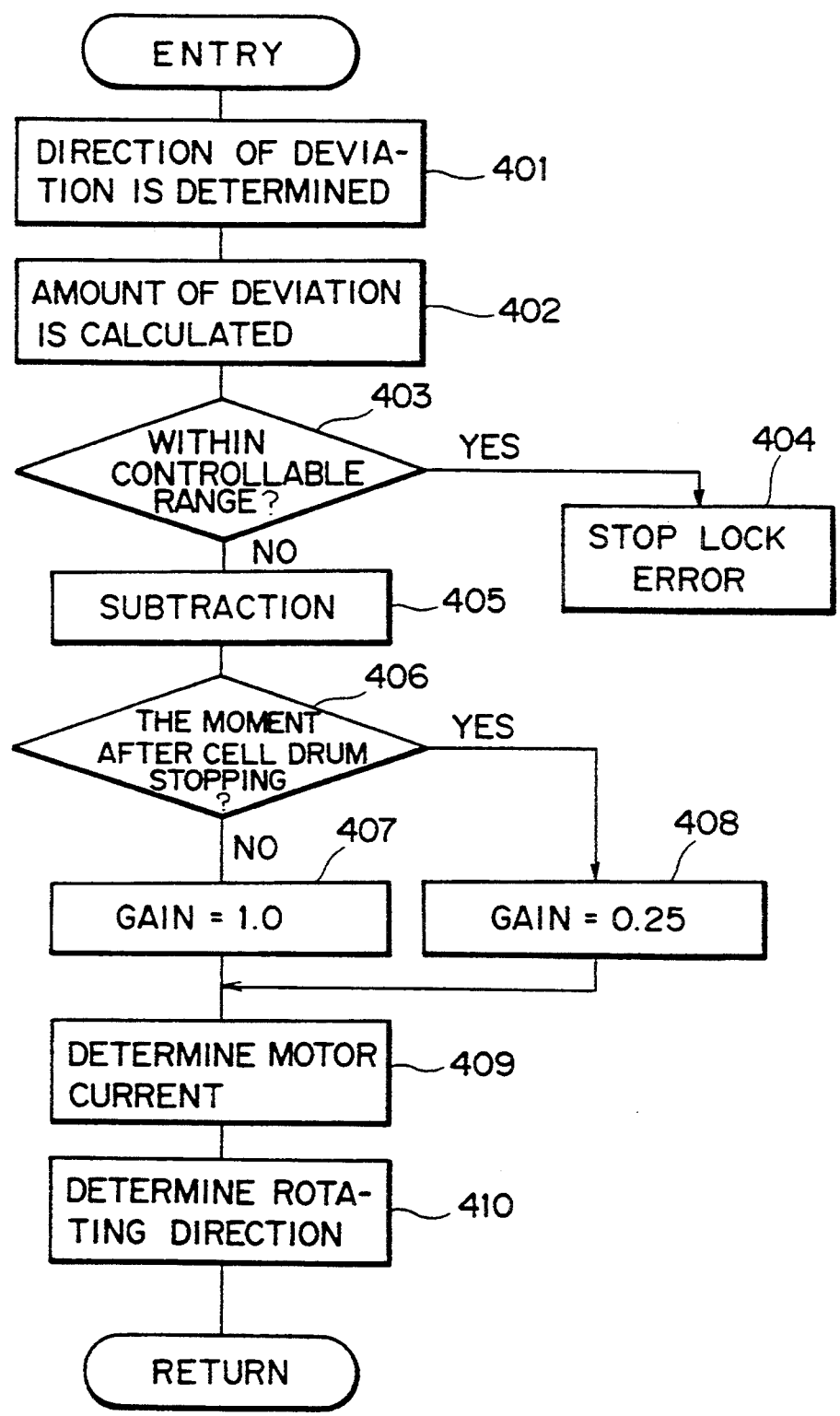
FIG. 22 is a flow chart of a positioning control routine corresponding to FIG. 21.

FIG. 22 is a flow chart of a positioning control routine corresponding to FIG. 21. In step 401, the direction of the deviation in position is determined and, in the following step 402, the amount of deviation is calculated. In step 403, it is decided whether or not the amount of deviation is within the controllable range, and when it is beyond the controllable range, the case is treated as stop lock error in step 404. When the deviation is decided to be within the controllable range, step 405 is followed and, therein, the backlash (0.45 mm in this example) is subtracted from the deviation. In step 406, decision is made as to whether or not it is the moment immediately after the cell drum has stopped. When it is not the moment immediately after the stop, step 407 is followed and, therein, the gain of the directive value of the motor current is set to a considerably large value (for example 1.0). On the other hand, when it is decided that the moment is immediately after the stop, step 408 is followed and, therein, the gain of the directive value of the motor current is set to a considerably small value (0.25). Thus, depending on whether or not the moment is immediately after the stop, the currents actually supplied to the motor differ by four times for the same deviation. Then, in step 409, the motor current is determined and, in the following step 410, the rotating direction of the motor is determined.

In the positioning control according to FIG. 21 and FIG. 22, there is set up a constant hysteresis H. Accordingly, as long as the width of the backlash region corresponding to the hysteresis H remains unchanged, there is no possibility of occurrence of such trouble as vibration. However, when the gears 40 in the rotating mechanism 38 wear due to operation of the library system over a long time, the backlash region becomes larger. When the hysteresis H remains set at a constant value notwithstanding such a change in the backlash region, vibration tends to occur at the portion where the backlash region was enlarged. Therefore, in the following embodiment, it is arranged in the positioning control of the cell drum such that a backlash region of the gear is detected and the positioning current is decreased when the backlash region is detected.

Figure 23A:
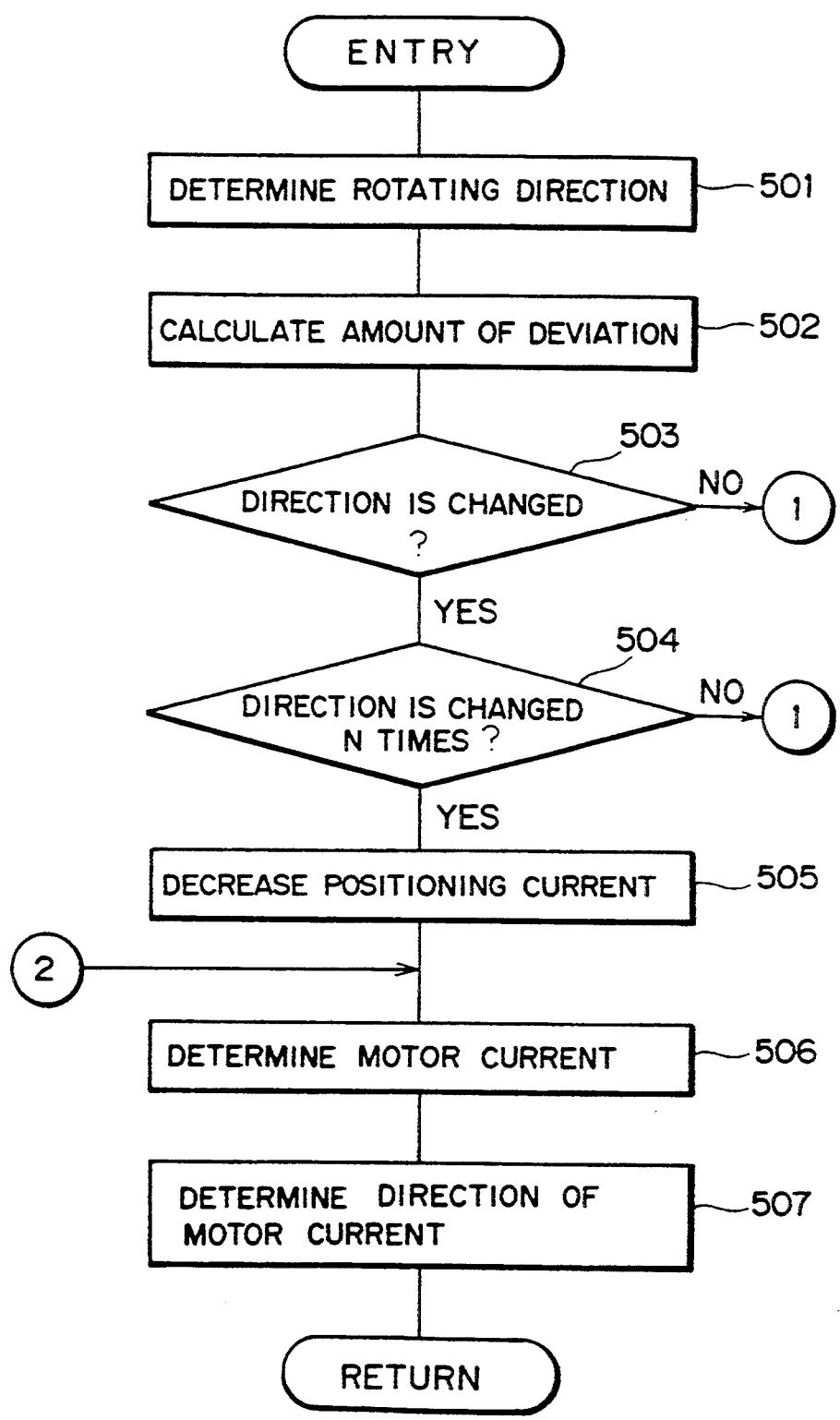
FIG. 23A and FIG. 23B are flowcharts of positioning control routine in which the backlash region is arranged to be actually detected.
Figure 23B:
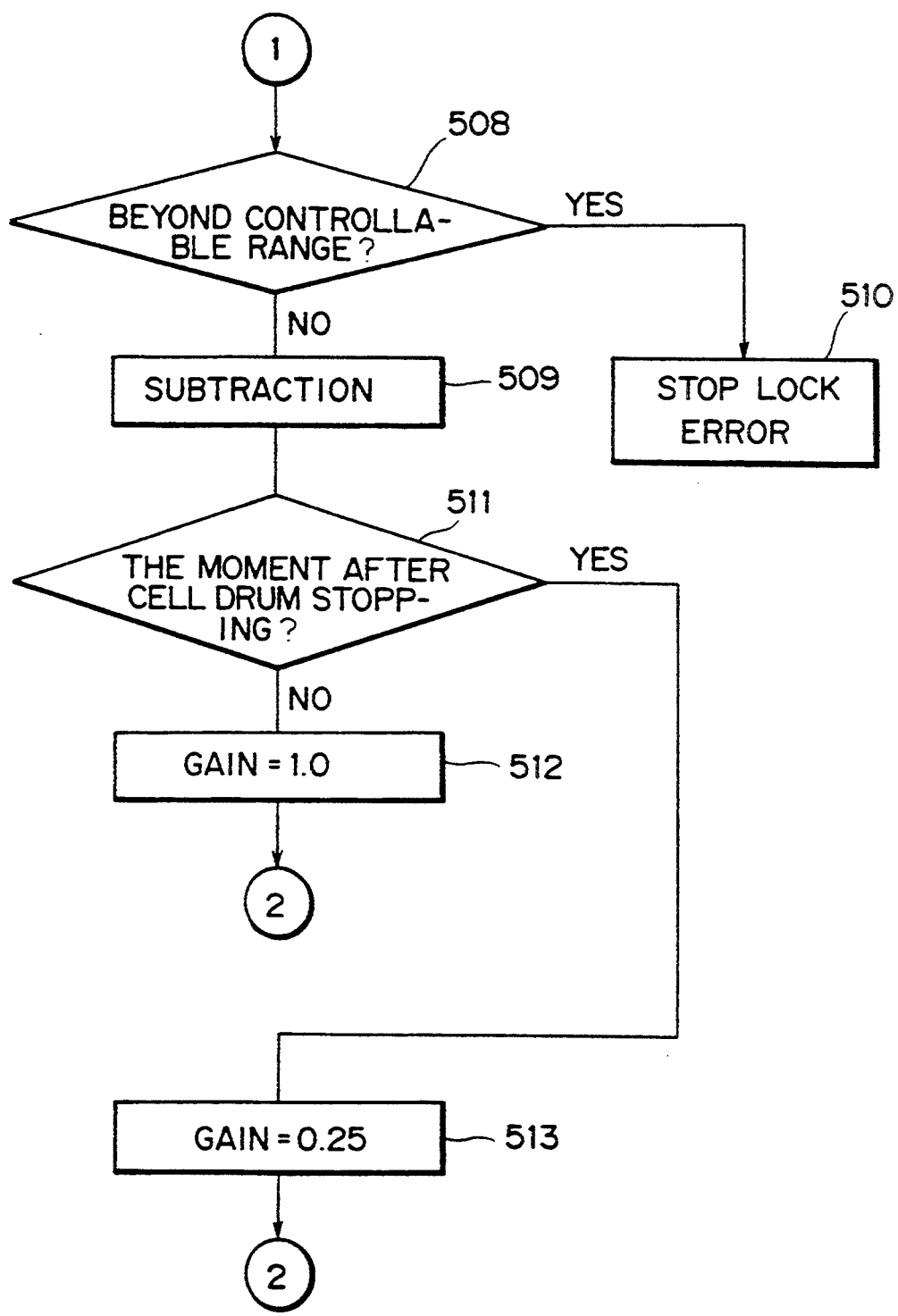

FIG. 23A and FIG. 23B are flow charts for positioning control routine in which the backlash region is arranged to be actually detected. The positioning control routine is repeatedly executed at predetermined timing. In this routine, first, the direction of the positional deviation of the cell drum 12 is determined (step 501) and the amount of the deviation is calculated (step 502). Then, the MPU 50 (refer to FIG. 8) decides whether or not the direction of deviation at the timing of the present call of the routine is the same as that at the timing of the previous call of the routine (step 503). If the directions of deviation are different, it is decided whether or not the direction of deviation has changed N (integer) times (step 504). When the direction of deviation at the present timing is the same as that at the previous timing or when the number of the changes in the direction of deviation is less than N, control is executed in the same manner as in the routine of FIG. 22. More specifically, it is decided whether or not the amount of deviation is beyond the controllable range (step 508), and when it is beyond the range, the case is treated as a stop lock error (step 510). If the amount of deviation is within the correctable range, the backlash is subtracted from the amount of deviation and the hysteresis is set up (step 509). Then, it is decided whether or not the present moment is immediately after the cell drum has stopped (step 511) and the gain of the motor current directive value is set up (step 512 or 513). Then, the motor current is determined (step 506) and the direction of the motor current is determined (step 507). When it is decided in steps 503 and 504 that the direction of deviation at this time is different from that at the previous time and that the direction of deviation has changed N times, the MPU 50 decides that the rotating mechanism is within the backlash region and decreases the positioning current (step 505). When the backlash region is detected in the present embodiment, it is arranged such that the positioning current is decreased to the current value corresponding to the inertia of the rotating portion which is directly coupled to the motor 32 (refer to FIG. 6). The positioning current may also be changed to zero when the backlash region is detected. Through steps 506 and 507, the motor current and its direction are determined.

Figure 24:
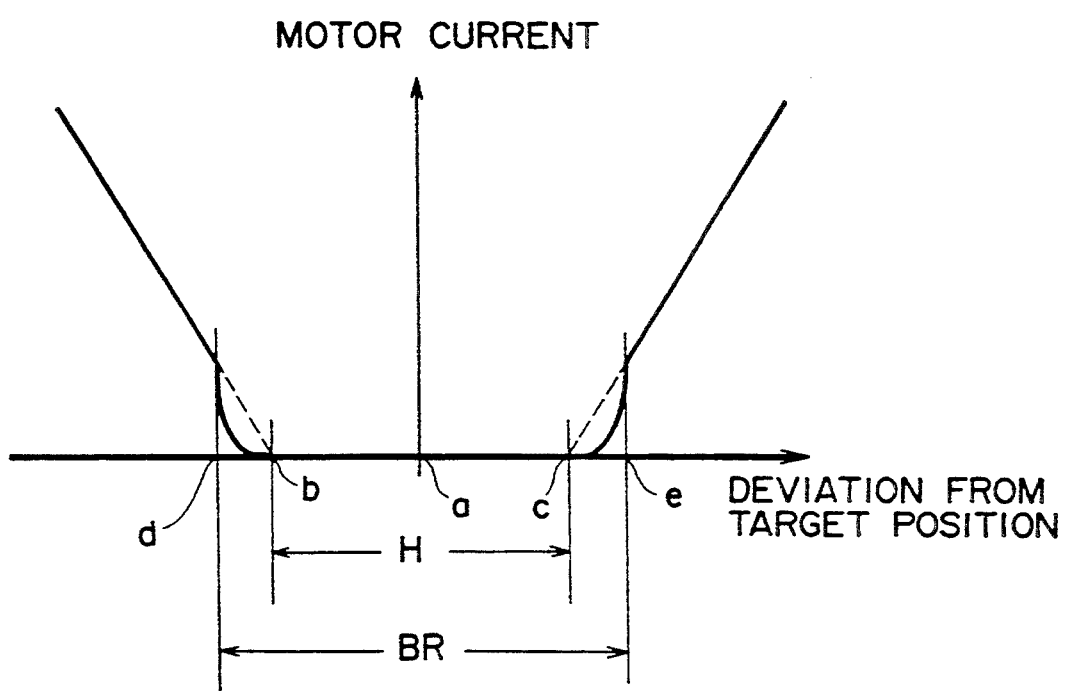
FIG. 24 is a graph explanatory of a positioning current determined in the routine shown in FIG. 23A and FIG. 23B.

FIG. 24 is a graph explanatory of the motor current determined in the routine shown in FIG. 23A and FIG. 23B. The point a, point b, and point c along the axis of abscissas are correspondent to respective points in FIG. 21. Now, we suppose that the actual backlash region BR is increased from that corresponding to the preset constant hysteresis H. In order to cope with such increase in the backlash region due to wear of the gear or the like, it is effective to re-establish the hysteresis H when the routine of FIG. 22 is employed. On the contrary, when the routine shown in FIG. 23A and FIG. 23B is employed, it is not necessary to change the hysteresis H. The reason for the above is because, even if the point d and the point e along the axis of abscissas of the graph of FIG. 24 defining both ends of the backlash region BR may suffer a change due to wear of the gear or the like, it is adapted therein such that the region d to b and the region e to c are decided to be within the backlash region and, accordingly, the motor current is automatically reduced and, thereby, occurrence of vibration can be kept prevented.

Figure 25:
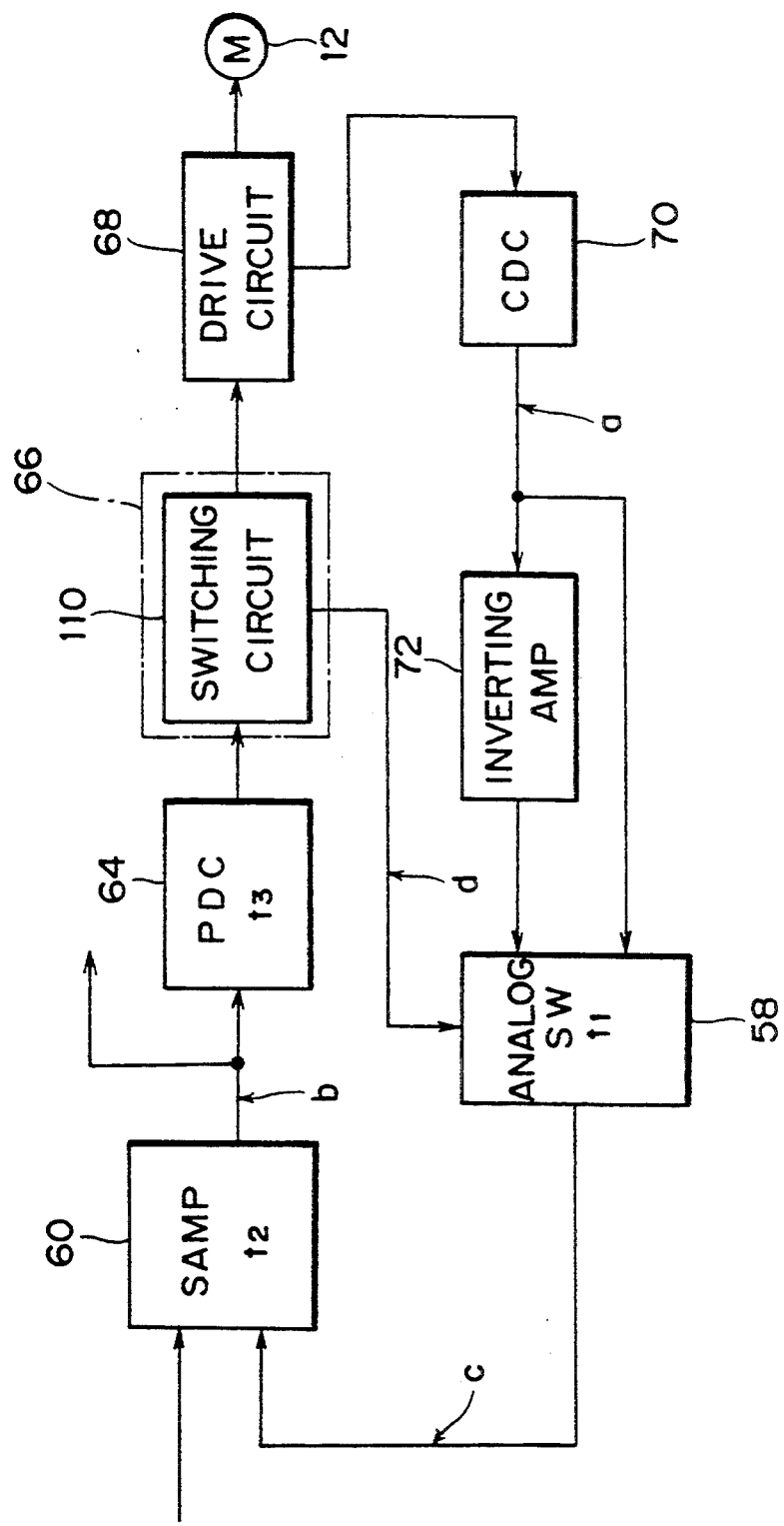
FIG. 25 is a block diagram showing a portion extracted from the control circuit of FIG. 8.

Below will be given description of a control circuit of a DC servomotor having a high controlling response in the negative feedback control of the motor current. FIG. 25 is a block diagram showing a portion extracted from the control circuit of FIG. 8, and FIG. 26A and FIG. 26B are waveform charts of signals at several points in FIG. 25. While a current detection signal (a) of the motor 32 output from the current detecting circuit 70 is directly supplied to the analog switch 58, the inverted signal of the current detection signal by the inverting amplifier 72 is also supplied to the analog switch 58. The analog switch 58 selects either one of the current detection signal and its inverted signal according to a switching signal (d) from a switching circuit 110 within the switching control circuit 66 and supplies the selected signal to the summing amplifier 60 as a feedback signal (c). The polarity discriminating circuit 64 discriminates between polarities of the sum output (b) and inputs the result of discrimination to the switching circuit 110. The switching circuit 110 generates the switching signal (d) on the basis of the result of discrimination in the polarity discriminating circuit 64 and supplies this signal to the analog switch 58. The analog switch 58 switch selects either the current detection signal from the current detecting circuit 70 or the inverted signal of the current detection signal by the inverting amplifier 72 for the purpose of causing the feedback signal of the motor current supplied to the summing amplifier 60 becomes a negative feedback signal with respect to the directive value of the motor current.

FIG. 26A is a waveform chart indicating an ideal feedback state in which the response time of each component part in FIG. 25 is assumed to be zero. In this case, the timing of change in the current detection signal (a) and the timing of change in the feedback signal (c) and in the sum output (b) agree with each other. When the circuit of FIG. 25 is actually constructed, however, it is usual that certain unavoidable response times are produced in component parts. The waveform chart in this case is shown in FIG. 26B. Time $t_1$ is the response time of the analog switch 58, $t_2$ is the response time of the summing amplifier 60, $t_3$ is the delay time of the switching signal in the polarity discriminating circuit 64 and the switching circuit 110, and $t_4$ is the switching time of the analog switch 58. The delay time T of the feedback signal (c) from the current detection signal (a) is expressed as $$T = t_1 + t_2 + t_3 + t_4$$

and it is known that the response times of the component parts of the circuit are accumulated. Accordingly, when the delay time is so large as not to be neglected, even if the current passed through the motor 32 is reversed, there is sometimes produced a period during which the sign of the feedback signal input to the summing amplifier 60 remains unchanged and, hence, the feedback becomes positive feedback during this period. Accordingly, in the following embodiment, a part of circuit structure where the problem of accumulation of response times is produced is modified so that the condition of the negative feedback may be improved.

Figure 28A:
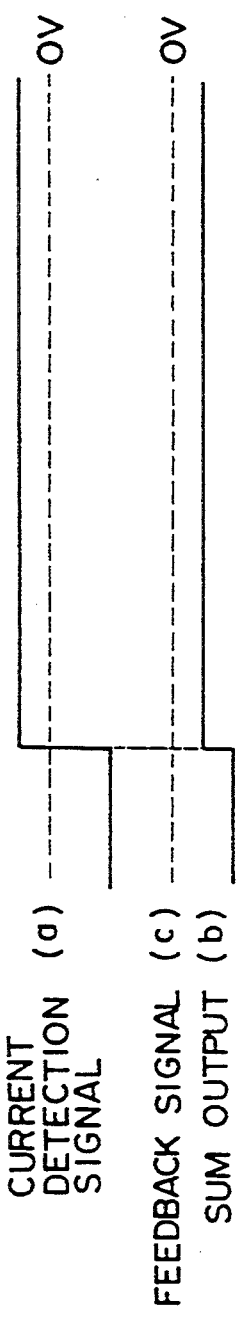
FIG. 28A and FIG. 28B are waveform charts of signals at several points in the control circuit shown in FIG. 27.
Figure 28B:
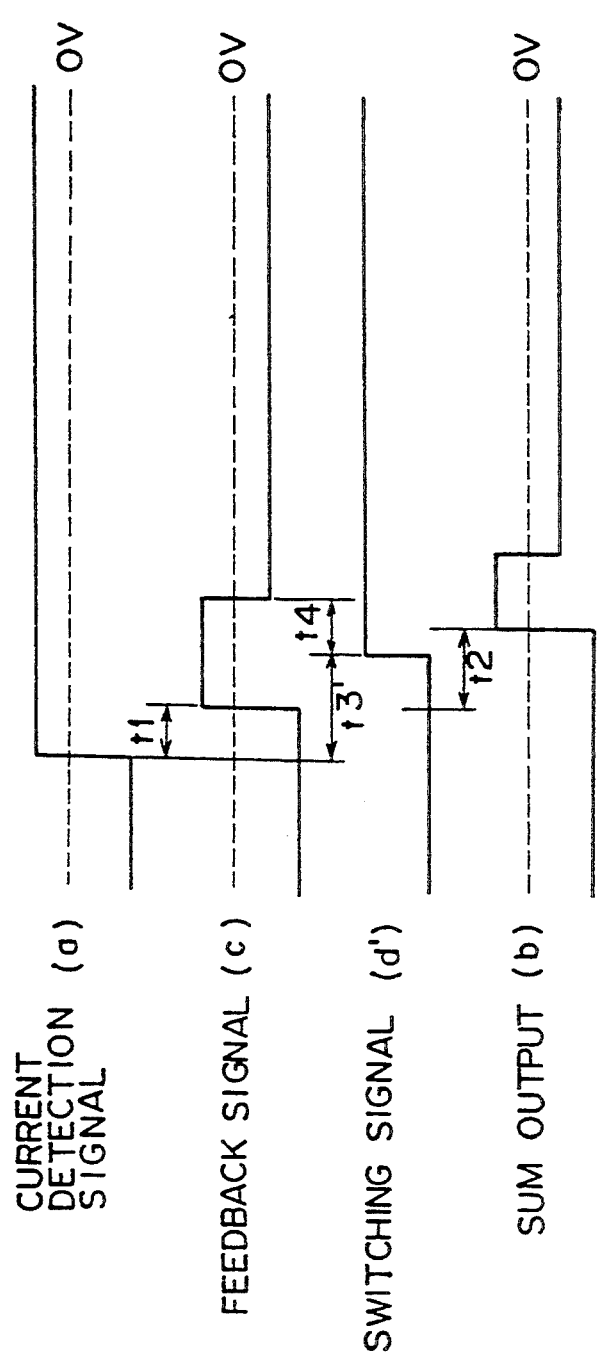

FIG. 27 is a block diagram showing an example of improvement of the circuit of FIG. 25, and FIG. 28A and FIG. 28B are waveform charts of signals at several points in FIG. 27. The structure of FIG. 27, compared with the structure of FIG. 25, is characterized in that it further comprises a sign discriminating circuit 112. The sign discriminating circuit 112, upon receipt of the current detection signal (a) from the current detecting circuit 70, discriminates between the positive and negative polarities, generates a switching signal (d') according to the result of discrimination, and supplies this signal to the analog switch 58. The output signal of the sign discriminating circuit 112 is also supplied to the switching circuit 110 for its use in the switching control. Since the resistor R1 (refer to FIG. 9) for motor current detection is connected in series with the motor 32, the current detection signal (a) has its sign (polarity) changed according to the direction of the current flowing through the motor 32. Since the current flowing through the motor 32 and the current flowing through the resistor R1 change simultaneously, quick operation of the analog switch 58 can be achieved by making sign discrimination on the basis of the current detection signal, and thereby the feedback is prevented from becoming positive feedback.

FIG. 28A and FIG. 28B correspond to FIG. 26A and FIG. 26B, respectively. Since, in the present embodiment, the delay of the switching signal (d') from the current detection signal (a) is produced only by the response time of the sign discriminating circuit 112, the delay time $t_3'$ is very small. Hence, there is produced no accumulation of response times of the component parts in the circuit and a good response characteristic can be obtained.

The control circuit described with reference to FIG. 27 is applicable to other motors than the cell drive motor 32. The control circuit is applicable for example to the swivel motor 34 or the elevator motor 36 for the accessor 24 shown in FIG. 4.

While the invention has been described with reference to particular embodiments, these embodiments are given by way of illustration only and not limitative of the present invention. For example, other recording media than the magnetic tape cartridges such as magnetic disks or optical disks may be used. The scope of the invention is defined by the appended claims and all changes and modifications as fall within the equivalence of the scope of the claims are therefore to be embraced by the invention.

What is claimed is:

1. A recording medium library system retaining up to a predetermined number of cartridge type recording media for recording/reproducing data on said recording media comprising:
   a cell drum having a plurality of cells arranged in a circular direction, said cells storing said recording media therein;
   a motor having a shaft, said motor outputting torque through said shaft;

a rotating mechanism, said rotating mechanism rotatably supporting said cell drum and transmitting output torque from said motor to said cell drum;

a tachometer connected to said shaft, said tachometer outputting a signal corresponding to the rotating speed of said shaft;

motor drive means receiving the output signal from said tachometer for driving said motor such that said cell drum rotates a desired total angle of rotation, wherein said total angle of rotation is an angle of rotation necessary for moving a desired cell selected from said plurality of cells to a target position; and processor means for inputting a value including input inertia of said cell drum to said motor drive means, said input inertia varying according to the number of said recording media stored in said cell drum and weight of each recording medium; wherein said motor drive means includes:

means for supplying an accelerating current to said motor until said cell drum attains a predetermined speed;

means for supplying a braking current determined according to said input interia to said motor; and means for supplying a positioning current to said motor for positioning control of said desired cell to said target position.

2. A library system according to claim 1, wherein said processor means includes measurement means for actually measuring said inertia, and said measurement means includes:

response detection means for detecting a response characteristic of said cell drum obtainable against a predetermined value of the output torque of said motor on the basis of the output signal of said tachometer; and calculation means for calculating the inertia of said cell drum on the basis of the output of said response detection means.

3. A library system according to claim 2, wherein said measurement means further includes means for supplying said motor with a step current such that said cell drum changes its speed from a predetermined initial speed, and said response characteristic is related to the rate of change of the angle of rotation or the rotating speed of said cell drum at a point of time when a predetermined period of time elapsed after the rise of said step current.

4. A library system according to claim 3, wherein said initial speed is zero, and said step current is supplied to said motor such that the speed of said cell drum increases from zero.

5. A library system according to claim 3, wherein a plurality of points are taken as said point of time, and rates of changes at each of the points of time are subjected to an averaging process.

6. A library system according to claim 3, wherein said calculation means has a map on which previously obtained values of inertia against each of values of said rate of change are stored.

7. A library system according to claim 1, wherein said motor drive means further includes means for supplying said motor with a holding current for allowing said cell drum to make a constant speed rotation with said predetermined speed.

8. A library system according to claim 1, further comprising:

a library body having an inlet and an outlet of said recording medium;

a recording/reproducing unit provided within said library body for recording/reproducing data on said recording medium; and an accessor provided within said library body for moving said recording medium between two members of said inlet, said outlet, said recording/reproducing unit, and said cell drum, wherein said target position is the position where said accessor is accessible to said desired cell.

9. A library system according to claim 8, wherein said cell drum has said cells arranged in its axial direction in a plurality of tiers, and said accessor moves said recording medium both horizontally and vertically.

10. A library system according to claim 8, wherein said library body further has a door allowing said recording medium to be directly charged into said cell drum from outside the same or discharged from the cell drum to outside the same.

11. A library system according to claim 1, wherein said recording medium is a magnetic tape cartridge.

12. A library system according to claim 1, wherein said braking current has a constant current flow.

13. A library system according to claim 1, further comprising speed control means for executing rotating speed control of said motor, wherein said braking current is corrected under said rotating speed control.

14. A library system according to claim 13, wherein said speed control means includes:

means for receiving the output signal of said tachometer and generating an error signal corresponding to the difference between the rotating speed of said motor obtained from said output signal and a reference speed; and means for receiving said error signal, generating a correcting current, which is correspondent to the magnitude and sign of said error signal, and adding said correcting current to the directive value of said braking current.

15. A library system according to claim 14, wherein said speed control means repeatedly performs its controlling operations at predetermined timing.

16. A library system according to claim 1, wherein said rotating mechanism has speed changing means including at least two gears, and wherein said motor drive means further includes:

backlash detection means for detecting a backlash region in said speed changing means; and first reducing means for reducing said positioning current when said backlash region is detected.

17. A library system according to claim 16, wherein said positioning current is repeatedly supplied to said motor at predetermined timing.

18. A library system according to claim 17, further comprising means for detecting the direction of a deviation of said desired cell from said target position on the basis of the output signal from said tachometer, wherein said backlash detection means includes:

means for deciding whether or not a first condition that the directions of the deviation at the preceding timing and at the present timing are different is satisfied; and means for deciding whether or not a second condition that the directions of said deviation successively change a predetermined number of times is satisfied, and wherein said backlash region is detected when said first condition is satisfied and, in addition, said second condition is satisfied.

19. A library system according to claim 18, further comprising means for deciding whether or not a moment when said backlash region is deleted is the moment immediately after stoppage of said cell drum, wherein said motor drive means further includes second reducing means for reducing said positioning current when one of first condition or said second condition is not satisfied and, in addition, it is decided that the moment is immediately after stoppage of the cell drum.

20. A library system according to claim 16, wherein said first reducing means, when said backlash region is detected, reduces said positioning current to a current value corresponding to inertia of a rotor, including said shaft, of the motor.

21. A library system according to claim 16, wherein said tachometer is directly coupled to said shaft.

22. A library system according to claim 1, wherein said tachometer outputs a first and a second full pulse having a phase difference of 90° therebetween, said library system further comprising means for generating quarter pulses at the rises and falls of said first and second full pulses, wherein said total angle of rotation is set up with the number of counts of said quarter pulses, and the rotating direction of said cell drum is detected according to the phase difference between said first and second full pulses.

23. A library system according to claim 1, wherein said motor is a DC servomotor, and wherein said processor means comprises a host computer and said motor drive means includes:

an adder circuit for adding a feedback signal to a directive value from a host computer;

a circuit receiving the output from said adder circuit for generating a pulse train for driving said motor;

a circuit receiving said pulse train and a signal from said host computer for generating a switching control signal;

a drive circuit receiving said switching control signal for driving said motor; and a current detecting circuit for detecting a current flowing through said motor, wherein said feedback signal is generated on the basis of the output signal of said current detecting circuit.

24. A library system according to claim 23, wherein said motor drive means further includes:

a circuit receiving the output signal of said current detecting circuit for outputting inverted signal of the received signal;

an analog switch receiving said inverted signal and the output signal of said current detecting circuit for selecting either said inverted signal or said output signal of said current detecting circuit and supplying the selected signal to said adder circuit as said feedback signal; and a sign discriminating circuit for discriminating between positiveness and negativeness of the output signal of said current detecting circuit, wherein said analog switch operates, on the basis of the result of discrimination in said sign discriminating circuit, such that said feedback signal produces a negative feedback effect on said directive value.

25. A library system according to claim 24, wherein said drive circuit includes a resistor connected in series with said motor, and said current detecting circuit detects the voltage drop across said resistor.

26. A library system according to claim 24, wherein said switching control signal is generated according to the result of discrimination in said sign discriminating circuit.

27. A control circuit of a DC servomotor comprising:

adder means for adding a feedback signal to a directive value from a host control unit to produce an output;

means for receiving the output from said adder means and for generating a pulse train for driving said motor;

means for receiving said pulse train and a signal from said host control unit and for generating a switching control signal based on said signal from said host control unit;

drive means for receiving said switching control signal and for driving said motor;

current detection means for detecting current flowing through said motor and producing a current output corresponding to said current;

output means receiving the current output signal from said current detection means and for outputting its inverted signal;

an analog switch receiving said inverted signal and the current output signal of said current detection means for selecting either the inverted signal or the current output signal and outputting the selected signal to said adder means as said feedback signal; and sign discrimination means for discriminating between positiveness and negativeness of the current output signal of said current detection means, wherein said analog switch operates, on the basis of the result of discrimination in said sign discrimination means, such that said feedback signal produces a negative feedback effect on said directive value.

* * * * *

UNITED STATES PATENT AND TRADEMARK OFFICE
CERTIFICATE OF CORRECTION

PATENT NO. : 5,432,419
DATED : July 11, 1995
INVENTOR(S) : Watanabe et al.

It is certified that error appears in the above-indentified patent and that said Letters Patent is hereby corrected as shown below:

Column 1, line 56, delete "for".

Column 8, line 67, delete "1,00,000" and insert --100,000--.

Column 13, line 60, delete "t" and insert --to--.

Column 19, line 24, delete "interia" and insert --inertia--.

Column 21, line 6, delete ", in addition,".

Column 21, line 10, delete "deleted" and insert --detected--.

Signed and Sealed this

Twenty-first Day of November, 1995

Attest:

BRUCE LEHMAN

*Attesting Officer*     *Commissioner of Patents and Trademarks*